(12) United States Patent
Boyd et al.

(10) Patent No.: US 6,767,464 B2
(45) Date of Patent: Jul. 27, 2004

(54) PROCESS AND APPARATUS FOR WASTE WATER TREATMENT

(75) Inventors: Steven H. Boyd, Falmouth, MA (US); Abdul R. M. Azad, Northboro, MA (US)

(73) Assignee: Environmental Operating Solutions, Inc., Falmouth, MA (US)

( * ) Notice: Subject to any disclaimer, the term of this patent is extended or adjusted under 35 U.S.C. 154(b) by 0 days.

(21) Appl. No.: 10/317,966

(22) Filed: Dec. 12, 2002

(65) Prior Publication Data

US 2003/0155296 A1 Aug. 21, 2003

Related U.S. Application Data

(60) Provisional application No. 60/341,178, filed on Dec. 13, 2001.

(51) Int. Cl.[7] .............................. C02F 3/02; C02F 3/30
(52) U.S. Cl. ....................... 210/610; 210/620; 210/139; 210/177; 210/199
(58) Field of Search ................................ 210/139, 620, 210/610, 177, 601, 170, 220, 199

(56) References Cited

U.S. PATENT DOCUMENTS

| | | | |
|---|---|---|---|
| 4,693,827 A | 9/1987 | Mordorski .................. 210/614 |
| 4,749,491 A | 6/1988 | Lawes et al. ............... 210/610 |
| 4,882,059 A | 11/1989 | Wong et al. ................ 210/606 |
| 5,150,988 A | 9/1992 | Powell et al. ............... 405/258 |
| 5,227,067 A | 7/1993 | Runyon ..................... 210/606 |
| 5,227,068 A | 7/1993 | Runyon ..................... 210/610 |
| 5,288,407 A | 2/1994 | Bodwell et al. ............ 210/617 |
| 5,588,777 A | 12/1996 | Laak ........................... 405/40 |
| 5,601,720 A | 2/1997 | Schmid ...................... 210/612 |
| 5,733,455 A | 3/1998 | Molof et al. ................ 210/605 |
| 5,739,031 A * | 4/1998 | Runyon ..................... 435/262 |
| 5,776,344 A | 7/1998 | McCarty et al. ........... 210/605 |
| 5,811,289 A | 9/1998 | Lewandowski et al. ..... 435/262 |
| 5,863,435 A | 1/1999 | Heijnen et al. ............. 210/605 |
| 5,948,260 A | 9/1999 | Attaway, III et al. ....... 210/603 |
| 6,025,152 A | 2/2000 | Hiatt ........................... 435/42 |
| 6,066,256 A | 5/2000 | Henry et al. ................ 210/614 |
| 6,077,432 A | 6/2000 | Coppola et al. ............ 210/611 |
| 6,183,642 B1 | 2/2001 | Heijnen et al. ............. 210/605 |
| 6,203,702 B1 | 3/2001 | Sheaffer ..................... 210/614 |
| 6,402,941 B1 * | 6/2002 | Lucido et al. ................ 210/94 |
| 2002/0170857 A1 | 11/2002 | McGrath et al. ............ 210/610 |

FOREIGN PATENT DOCUMENTS

| | | |
|---|---|---|
| DE | 40 21 536 | 1/1992 |
| DE | 198 34 945 | 2/2000 |
| EP | 0 831 064 | 3/1998 |
| EP | 0 997 442 | 10/1999 |
| EP | 1 151 967 | 5/2000 |
| JP | 09-299975 | 11/1997 |
| JP | 10-277573 | 10/1998 |
| JP | 10-057762 | 3/1999 |
| JP | 2000-084587 | 3/2000 |
| JP | 2001-000990 | 1/2001 |
| JP | 2001-321792 | 11/2001 |

OTHER PUBLICATIONS

Copy of the International Search Report dated Mar. 28, 2003.

* cited by examiner

*Primary Examiner*—Duane Smith
*Assistant Examiner*—Douglas J. Theisen
(74) *Attorney, Agent, or Firm*—Nields & Lemack

(57) ABSTRACT

Systems for treating water containing unwanted contaminants. More particularly, the present invention relates to waste water treatment systems including biological media used to aerobically or anaerobically treat solid and liquid waste in water for large and small-scale waste water systems in a way that minimizes the size of the system required to output high-quality, environmentally suitable water that is depleted of ammonia, nitrites, nitrates and other contaminants.

18 Claims, 19 Drawing Sheets

OAR PROFILE
Oxic and Anoxic Reactor (OAR) with Apparatus.

Embodiment of the Invention for a Filter System.

Embodiment of the Invention for a Modified Nitrification Denitrification Filter System.

Improved Embodiment of the Invention for a
Modified Nitrification Denitrification Filter System.

Another Layout for Apparatus, shown for 1 liter Reactors.

Layout for Apparatus shown for 1 liter Reactors with Fixed Media in the Oxic and Anoxic Reactors

PROCESS AND APPARATUS FOR WASTE WATER TREATMENT

This application claims priority of provisional application Serial No. 60/341,178 filed on Dec. 13, 2001, the disclosure of which is hereby incorporated by reference.

BACKGROUND OF THE INVENTION

1. Field of the Invention

The present invention relates to systems for treating water containing unwanted contaminants. More particularly, the present invention relates to waste water treatment systems including biological media used to aerobically and anaerobically treat solid and liquid waste in the water. Still more particularly, the present invention relates to such treatment systems for large and small-scale waste water systems. The present invention includes novel methods for effectively treating waste water in a way that minimizes the size of the system required to output high-quality, environmentally-suitable, water depleted of ammonia, nitrites, nitrates, perchlorates and other contaminants.

2. Description of the Prior Art

Waste water treatment systems are ubiquitous, from the smallest single-family residence septic system, to industrial facilities for commercial operations and municipalities large and small. It is always the object of such systems to treat for total suspended solids (TSS), biochemical oxygen demand (BOD), nitrogen compounds, $E$-coli, phosphorous, and virtually any other bacteria, so as to minimize the quantity of such undesirables output by the system. Various well known means have been devised for achieving such goals, with varying degrees of success and efficiency. An overriding general problem, for the most part, with such prior systems has been the scale of operation required to effectively treat that water with high-quality output. That is, for the volumes of water to be treated, the sizes of these systems are correspondingly large. This may be particularly true for relatively small-scale systems, such as single-family residences and small groupings of homes and/or buildings, where coupling to a municipal treatment system may be unsuitable.

In the array of systems designed to treat waste water, many include the use of biological treatments to accelerate the breakdown of solids and the various contaminants associated with waste water. This biological treatment involves the use of microbes having an affinity for the pollutants contained in the water. That is, rather than simply permit solids to slowly decant from the waste water, and then apply a hazardous chemical treatment designed to destroy the pollutants—along with virtually everything else in the water—these microbes are permitted to act upon the waste water. In relative terms, they act to remove the pollutants faster than if nothing were used, and do so without the hazardous and difficulties associated with chemical treatment. They must, however, be permitted to reside in some type of holding tank, filter, fixed film or media in order to multiply and feed on the contaminants. Upon completion of their ingestion of the pollutants, the microbes simply die and end up as waste solids that fall to the bottom of the treatment tank or unit for subsequent removal. Some microbes may partially block the availability of surface area or volume resulting in voids of inactivity. The treated water then passes to the next stage, which may simply be some form of a leach bed, or it may be a more complex system, such as a reactor, including, but not limited to, an ultraviolet disinfection means, ozone treatment, or membrane filtration for subsequent transport to a body of water, or for recycling in non-critical uses, such as horticulture.

Unfortunately, while aerobic and anaerobic microbe treatment has significant advantages, it is not exceedingly effective in that it is necessary to provide sufficient "dwell time" or "residence time" for the microbes to "eat" enough of the pollutants so that the waste water is rendered satisfactorily contaminant-free. Of course, the extent to which contaminant removal is satisfactory is a function of governmental regulation. In any case, the volume of water that must be treated can often lead to the need for a rather large-scale treatment unit for a relatively small waste-water-generating facility. As a result, there is often a compromise in the prior systems, which compromise is associated with the contamination-removal requirements, the space available to treat the waste water output, and the cost associated with both. Some of these problems have been addressed by recirculation of the partially treated waste water for repeated treatments. Traditional wastewater treatment systems rely on effective treatment by the gradual accumulation of bacteria. This is common to all treatment schemes but especially pronounced in systems relying on vessels or containers in which air is introduced. Such systems, relying on the gradual accumulation of bacteria for treatment, inevitably will experience failure during hydraulic overload, power failure, temporary shutdown for maintenance or in response to seasonal flows. Often, during such events, the bacteria providing treatment wash through the system and after such an event, treatment efficiency is compromised.

Another problem with such prior systems has been their efficiency over a period of time of use. When the waste water to be treated requires the use of a considerable amount of biological mass, there results a problem of "plugging" of the mass. That is, as waste solids build up on the surface of the mass, or as microbes ingest the pollutants and die they do not always fall to the bottom of the tank. Instead, they become trapped at or near the surface of the mass. This plugging or blocking of the mass significantly reduces the pathways by which subsequent pollutants may pass through to underlying active microbes that are located below the surface of the mass. There are two negative results: 1) the acceleration of pollutant decay caused by microbe ingestion is canceled; and 2) water flow through the mass is reduced and possibly even stopped. It is therefore necessary to either build a substantially larger unit than would otherwise be required—in order to account for this plugging—or to expend the effort to clean the clogged system. Such maintenance may include the introduction of agitation means or the use of pressurized water for removal of dead microbes.

Several prior waste-water treatment systems have been described. These systems have apparently been designed for large- and/or small-scale treatment using biological media to accelerate contaminant reduction. For the most part, they include biological treatment as well as mechanisms designed to enhance the effectiveness of the microbial action. However, each in turn suffers from one or more deficiencies that significantly affect the ability to provide the most effective and relatively inexpensive waste treatment system.

Nitrogen in its oxidized states (e.g. as nitrates or nitrites) can seep into ground waters, causing problems in drinking water. Drinking water standards generally limit the concentration of nitrate to 5 to 10 mg/l, yet effluent from a modern treatment plant may have natural levels greater than 20 mg/l. Nitrogen in its reduced state, as ammonia, is toxic to fish, and severe limits are in effect on many streams to control the maximum concentration.

A conventional method of nitrogen removal is by biological means. With sufficient time, oxygen, and the proper mass of microorganisms, organic nitrogen is biologically converted to ammonia and then further oxidized to nitrate forms. This conversion occurs under aerobic (with oxygen) conditions, and is relatively easy to accomplish, resulting naturally under different known types of waste treatment processes. At this point the nitrogen has not been reduced in concentration, only converted to a different form.

A practical means to remove nitrate is to convert them to nitrogen gas. At this point $N_2$ will evolve from the water and become atmospheric nitrogen. As atmospheric nitrogen, it is not a water pollutant. Nitrates are best converted to nitrogen gas by microbial action. Under anoxic conditions (without free dissolved oxygen), many common bacteria with a demand for oxygen are able to biochemically remove the oxygen from the nitrate ion, leaving nitrogen gas. This process is called biological denitrification.

For denitrification to occur, the nitrogen must first be converted to nitrates and then the bacteria must have a food source to create a demand for oxygen. This food source may be from outside, like a chemical addition of methanol, by the addition of sewage, or by the natural demand of the organisms (endogenous respiration). This natural demand must occur under conditions where free oxygen is absent.

In the conversion of organic nitrogen and ammonia to nitrates adequate aeration must be provided, and this aerobic process also results in removal of carbon. However, carbon must be present during the denitrification by dentrifying bacteria. Accordingly carbon has to be reintroduced into the system, and this is commonly done by addition of methanol in the art. The biochemical reaction which occurs when methanol is used as the carbon source results in production of nitrogen gas, carbon dioxide and water. The amount of methanol required is about three times the weight of nitrogen compounds to be removed. As is known in the art, other carbon sources can be used.

U.S. Pat. No. 4,005,010 issued to Lunt describes the use of mesh sacks containing the biological medium. The sacks are apparently designed to hold the microbes while allowing fluids to pass through. This unit nevertheless may still result in plugging in that the biological medium will likely become clogged during the course of its usage. Furthermore, the capacity of the unit is directly dependent on the wetted surface area that can be produced for microbial growth. U.S. Pat. No. 4,165,281 Kuriyama et al. describes a waste water treatment system that includes a mat designed to contain the microorganisms. A plurality of mats is disposed vertically and waste water is supposed to pass therethrough. The likelihood of plugging is greater in this unit than in the Lunt device because of the orientation of the mats and the difficulty in maintaining and/or replacing them.

U.S. Pat. No. 4,279,753 issued to Nielson et al. describes the arrangement of a plurality of treatment reactors, alternating from aerobic to anaerobic action. There may be some advantage in using a plurality of small tanks rather than one large tank to achieve the decontamination required in that dwell time is increased; however, this is certainly more costly than is necessary. Moreover, while Nielson indicates that it is necessary to address plugging problems, the technique for doing so is relatively crude and likely not completely effective. U.S. Pat. No. 4,521,311 issued to Fuchs et al. teaches the use of a filtering bed through which the waste water passes and which includes support bedding to suspend the biological medium. The device has a rather complex recirculation process required in order to ensure cleaning of the bedding and the microbes. This device may experience clogging of another sort, and the bedding particles described by Fuchs are required to go through a costly operation for maintenance.

U.S. Pat. No. 5,202,027 issued to Stuth describes a sewage treatment system that includes a buoyant medium in the shape of large hollow balls designed to provide a site for microbial growth. The buoyant balls form but a small portion of the system, which includes a series of complex turbulent mixing sections. The Stuth device is relatively complex and likely requires considerable energy to operate in order to ensure the mixing apparently required.

U.S. Pat. No. 5,221,470 issued to McKinney describes a waste water treatment plant having a final filter made of a sheet of plastic. The sheet of plastic is wrapped about itself so as to form passageways designed for microbe growth. While this design may increase the surface area and, therefore, the dwell time available for microbial action, it is likely that plugging will occur as the passageway will likely fill with dead microbes over a period of time.

U.S. Pat. No. 5,342,522 relates to a method for the treatment of (raw) sewage in a package plant consisting of three bioreactors in series. The treatment is being carried out using three types of biomass. In a first step phosphate is removed by biological means and, at the same time, the chemical and biological oxygen demand is lowered in a highly loaded active sludge system, in a second step a nitrification is carried out, ammonium being converted to nitrate, and in a third step a denitrification is carried out using a carbon source such as methanol or natural gas. The nitrifying and denitrifying bioreactors are both fixed film processes. The thickness of the biofilm on the support material in the nitrifying bioreactor can be influenced by adjusting the aeration system or by adjusting the hydraulic loading. In the denitrifying bioreactor the thickness of the biofilm can be adjusted by raising the shear by means of raising the superficial velocity in the support material. The system according to the invention makes possible effective treatment of raw sewage in a highly loaded system resulting in the far-reaching removal of COD, nitrogen and phosphate. The process can be operated in an alternative mode, where the nitrifying and denitrifying bioreactors are exchanged. The mixing in the nitrifying step is advantageously maintained by aeration under the packages of support material. The denitrifying step was accomplished by means of a propeller stirrer or impeller stirrer, which may be placed centrally in the vessel, was preferably used for active proper mixing. Polacel, reticulated polyurethane or any other carrier material were described as support material for the biomass.

U.S. Pat. No. 5,185,080 describes that in the denitrification chamber, pre-measured quantities of a composite material, containing bacteria and a source of carbon as food, is introduced daily or even bi-daily to the treated wastewater. The bacteria are heterotrophic, laboratory cultured and packaged, as a loose particulate material, capsules, pellets, tablets or other shaped forms. The bacteria Pseudomonas, normally present in the ground, is claimed to be prevalent in this material. The Pseudomonas microorganism has the capability of transforming nitrates to nitrogen gas. The technology of this conversion is well known. The preferred pre-measured microbial tablet includes a carbon supply (source) for biological synthesis. The need for a carbon source is discussed in Handbook of Biological Wastewater Treatment by Henry H. Benjes, Jr., Garland STPM Press, 1980. Denitrification using suspended or fixed growth systems is also discussed in the foregoing reference.

All the above prior art methods attempt to increase the surface area or volume available to microbes for nitrification and denitrification, and thereby increase the productivity of the treatment system.

The above systems are generally referred to as fixed film media or suspended media systems in that surface area for bacteria to grow are provided by the addition of surface. The suspended media bacteria that prefer surfaces would generally predominate such surfaces. However, such surfaces are still subject to failures due to system poisonings and upsets, and may not be easily restarted after such failures, as the surfaces are then contaminated or plugged with dead microbes.

U.S. Pat. No. 4,693,827 describes the addition of a rapidly metabolized soluble or miscible organic material to be added to the carbon consuming step of the process. Heterotrophic organisms consume the added material together with soluble ammonia to generate additional organisms, resulting in the reduction of the soluble ammonia concentration in the wastewater. The rapidly metabolized material comprises one or more short chain aliphatic alcohols, short chain organic acids, aromatic alcohols, aromatics, and short chain carbohydrates.

However, if too much of the rapidly metabolizing material is not introduced in a controlled manner, the heterotrophic organism will proliferate detrimentally. On the other hand if too little is added or in the absence of carbon, the organism will slowly die. Therefore, there is a need for an efficient delivery system for introducing independently carbon and rapidly metabolizing material, bacteria, nutrients and air to such systems. In addition, there is also a need for monitoring the performance of the system as to the extent of the treatment, and feedback from the monitoring detectors to the delivery system for efficient and optimum delivery of carbon, bacteria, nutrients and air.

In U.S. Pat. Nos. 5,863,435 and 6,183,642 issued to Heijen et. al. a method is described for the biological treatment of ammonium-rich wastewater in at least one reactor which involves the wastewater being passed through the said reactor(s) with a population, obtained by natural selection in the absence of sludge retention, in the suspended state of nitrifying and denitrifying bacteria to form, in a first stage with the infeed of oxygen, a nitrite-rich wastewater and by the nitrite-rich wastewater thus obtained being subjected, in a second stage without the infeed of oxygen, to denitrification in the presence of an electron donor of inorganic or organic nature, in such a way that the contact time between the ammonium-rich wastewater and the nitrifying bacteria is at most about two days, and the pH of the medium is controlled between 6.0 and 8.5 and the excess, formed by growth, of nitrifying and denitrifying bacteria and the effluent formed by the denitrification are extracted. In addition the growth rate of the nitrifying and denitrifying bacteria is expediently controlled by means of the retention time, in the reactor, of the wastewater to be treated which is fed in. The electron donor of inorganic nature is selected from the group consisting of hydrogen gas, sulfide, sulfite and iron (III) ions, and said electron donor of organic nature is selected from the group consisting of glucose and organic acids, aldehydes and alcohols having 1–18 carbon atoms. However, such a system could fail based on washouts, introduction of toxic substances, and there will be lag time before the system performs properly. In addition, while organic solvents such as methanol are liquid, and can be introduced as liquid, they are flammable and toxic, and not preferred by many waste water system operators. Lower carbohydrates such as glucose and dextrose while non-toxic, are solids, and require special solid delivery methods to introduce into water treatment systems, and therefore not generally used in the industry. Aqueous solutions of lower carbohydrates may be used; however, such solutions are subject to premature biological degradation, and generally require introduction of antibacterial agents which are harmful for the nitrifiers and denitrifiers.

U.S. Pat. Nos. 4,465,594 and 5,588,777 disclose a wastewater treatment system that use grey water and soaps for denitrification in two different designs of wastewater systems. U.S. patent application 20020270857 by McGrath et al. published Nov. 21, 2002 discloses the use of a detergent or a detergent like compound for the denitrification of wastewater or nitrified water of U.S. Pat. No. 5,588,777. the application also discloses heating the denitrified wastewater as well as the addition of bacteria to the mixing tank. However, soaps, detergents and detergent like compounds are generally surface active and tend to damage the cell walls of bacteria, adhere to surfaces, interfere with bacterial functions, and are more expensive than methanol. In addition, the metabolism rate of such compounds would be low and would require longer dwell times in the denitrification zones, reactors or media.

Therefore, there is a need for aqueous solution compositions of electron donor or carbon containing material which are non-flammable, liquid; stable to storage, non-toxic to the environment and wastewater microorganisms, readily metabolized, such as carbohydrates and mixtures thereof, and which can be readily introduced to defined locations in wastewater treatment systems to assist in the nitrification and denitrification of wastewaters. In addition, such compositions may also be used for the removal of perchlorates and other pollutants.

The prior art has many examples of teachings that employ bacterial compositions to accomplish, or aid in accomplishing, the biologically mediated purification of wastewater. Hiatt U.S. Pat. No. 6,025,152 describe a methods and mixtures of bacteria for aerobic biological treatment of aqueous systems polluted by nitrogen waste products. Denitrifying bacterial compositions are used in combination with solid column packings in the teachings of Francis, U.S. Pat. No. 4,043,936. These compositions are believed to belong to the family of Pseudomonas. Hater, et al U.S. Pat. No. 4,810,385 teaches a wastewater purification process involving bacterial compositions comprising, in addition to non-ionic surfactants and the lipid degrading enzymes Lipase, three strains of *Bacillus subtillis,* 3 strains of *Pseudomonas aeruginosa*, one strain of *Pseudomonas stutzeri*, one strain of *Pseudomonas putida*, and one strain of *Eschericia hermanii* grown on a bran base. Wong, et. al., U.S. Pat. No. 5,284,587 teaches a bacterial composition, that is in combination with enzymes and a gel support is necessary to achieve satisfactory waste treatment. Bacterial species mentioned in Wong et al are *Bacillus subtillis, Bacillus licheniformis*, Cellulomonas and *acinetobacter lwoffi*. Similarly, Wong and Lowe, U.S. Pat. No. 4,882,059 teach a process for biological treatment of wastewater comprising bacterial species that aid in the solubilization of the solid debris. The bacterial species used in the teaching of Wong and Lowe are of the following bacterial types: *Bacillus amyloliquefaciens* and *aerobacter aerogenes*. These bacterial types are taught to be employed primarily for solubilization and biodegradation of starches, proteins, lipids and cellulose present in the waste product.

Hiatt U.S. Pat. No. 6,025,152 describes the addition of bacterial mixtures in the spore form. Most water treatment systems have residence or dwell times of 2 days or less, and addition of bacteria in the spore form will lead to a substantial portion of bacteria being washed out of the system before it has time to establish, because the environment is not always conducive for bacterial growth.

U.S. Pat. No. 5,185,080 issued to Boyle discloses a system for the treatment of nitrate containing wastewater from home or commercial, not municipal, in which the wastewater is contacted underground by denitrifying bacteria introduced to the treatment zone periodically; the treatment zone being maintained at or above the temperature at which the bacteria are active on a year-round basis by the ground temperature.

U.S. Pat. No. 5,811,289 issued to Lewandowski et al. discloses an aerobic waste pretreatment process which comprises inoculating a milk industry effluent with a mixture of bacteria and yeasts both classes of microorganisms capable of living and growing in symbiosis in the effluent, the population of the bacteria being, in most cases, several times greater than the population of the yeasts, maintaining the temperature and pH of the inoculated effluent between 0.degree. C. and 50.degree. C. and between 1.7 and 9, aerating the effluent while varying, if necessary, the pH at maximum rate of 1.5 pH units per minute and also, if required, modulating the aeration of the inoculated effluent at a maximum rate of 130 micromoles of oxygen per minute.

U.S. Pat. No. 6,077,432 issued to Coppola et al. discloses a method and system for carrying out the bio-degradation of perchlorates, nitrates, hydrolysates and other energetic materials from wastewater, including process groundwater, ion exchange effluent brines, hydrolyzed energetics, drinking water and soil wash waters, which utilizes at least one microaerobic reactor having a controlled microaerobic environment and containing a mixed bacterial culture. It is claimed that using the method of invention, perchlorates, nitrates, hydrolysates and other energetics can be reduced to non-detectable concentrations, in a safe and cost effective manner, using readily available non-toxic low cost nutrients. The temperature of the reactor was maintained at 10 to 42 degrees centigrade.

European Patent Application EP 1151967A1 published Nov. 7, 2001, to Nakamura discloses a liquid microorganism preparation which contains enzymes generated by anaerobic microorganisms, facultative anaerobic microorganisms and aerobic microorganisms will be propagated in a growth tank to make microorganism enzyme water. The obtained enzyme water will be added to a grease trap that retains kitchen water which includes macromolecular organic matter, such as animal and vegetable waste oil, and will be stirred with aeration so that the enzymes and the organic materials will be in contact in order to decompose the organic matter. The decomposition residue and sludge will be separated so as to flow the supernatant water to the sewer pipe.

U.S. patent application Ser. No. 2002170857 published Nov. 21, 2002 to McGrath et al. describe a system for nitrified water that comprises a plurality of interconnected tanks including a mixing tank which feeds detention tanks which in combination provide a detention time period for the effluent. A controller determines the amount of detergent dispensed into the mixing tank in accordance with the measured volume of effluent to be treated. The mixing tank comprises a heater for maintaining the nitrified effluent temperature above 50 degrees F. The application also discloses the addition of small doses of bacteria into the mixing tank for denitrification, and heating means to heat the effluent in the mixing tank to accelerate denitrification. An optional line filter can be added to the output of the system for further reducing organic nitrogen concentration. Addition of bacteria or heating means for nitrification was not disclosed, and may be construed as being not necessary for the disclosure.

Therefore, there is a need for bacterial compositions which are not in the spore form or low growth phase, but are in the growth phase when added to the water treatment systems, will continue their growth in the water treatment systems after addition, and delivery means for such addition.

Therefore, there is a need for a waste water treatment apparatus and process that takes advantage of the useful characteristics of biological treatment in an effective manner of existing systems or new systems to be constructed. There is also a need for such an apparatus and process that maximizes the contact between contaminants from the waste water and the microbes without the need for a relatively large processing tank or unit, while providing the best conditions for the microbes to grow. Further, there is a need for an apparatus and process that is simple, energetically efficient, and sufficiently effective to reduce to desirable levels the TSS, BOD, *E-Coli*, nitrogen-containing compounds, phosphorus-containing compounds, and bacteria of wastewater in a cost-effective manner. In addition, there is a need for a treatment system and apparatus that can deliver microbes and nutrients optimally to enhance the efficiency and performance of the large number of water treatment systems already in operation for nitrification and denitrification without costly reengineering.

There are a large number of existing systems and apparatuses that are not performing efficiently in removing ammonia, nitrite and nitrate which could be made to perform efficiently by the current invention with relatively little cost. In addition, new systems could be made to perform efficiently by following the process described in the present invention.

SUMMARY OF THE INVENTION

The present invention relates to a system and method for treating wastewater from any mechanical or gravity system. This generally relates to placement of bacteria, enzymes, biological and chemical catalysts, such as nitrifying and denitrifying, carbon or electron donor sources and nutrients, and heating means in a system relative to oxygen and nitrogen sources, oxic, aerobic, anoxic, and anaerobic zones, using an apparatus. The apparatus may be in one or more parts. It refers to the placement of bacteria, enzymes, biological and chemical catalysts, nutrients and or electron donor, carbon sources or heating means in waste water systems in industrial, agricultural, commercial, residential, and other waste water systems; and the methods for treating pollutants or undesirable materials in waste water or polluted sites. These ingredients are frequently limiting in the efficient and proper functioning of the wastewater systems. Frequently, the bacterial species which are specific for the pollutant to be removed is not always present, or have a short life or not present in high concentrations to be effective. This will also be the case for suspended media as well as fixed film media. Therefore, there is a need for the delivery of the bacteria and electron donors in high concentration to allow for system efficiency and capacity without increasing the size or volume of the system. Furthermore, frequent testing and monitoring for the presence of the microbes is desirable to establish efficient system performance. The findings of constant demand for microbes and electron donor/carbon and micronutrients show the need for controlled addition. The volume available for fixed or suspended film surface area is small and limiting, and not all the microbes grow on surfaces. Solid media (materials) used as carbon or electron donor is not always adequate to supply the necessary electron donors due to solubility limitations, and could be supplemented by this invention.

The invention also includes stable compositions of carbon and carbon containing nutrient liquid mixtures of low viscosity which can be easily pumped, non-flammable, less damaging to beneficial bacteria, safer to handle than currently used organic solvents and less toxic to the environment when released and not subject to premature growth of bacteria and other microorganisms during storage and use. These bioremediation processes may be considered as fermentation processes applicable to pollutants, and the location placement of additives is important for the efficient functioning of these processes. The microbes can be bacteria or yeast, and other biological catalysts such as enzymes may also be used.

For example, in the case of nitrification and denitrification, methanol and other organic solvents are used as electron donors or carbon sources. However, these solvents are flammable and toxic, and its large scale use causes handling difficulties including special storage. In addition, methanol metabolism rate by many bacteria would be too slow for some systems, resulting in longer residence times and reduced productivity of treatment. Therefore there is a need for carbon sources that overcome the limitations of methanol and other carbon sources. The invention also includes alternative electron donor or carbon sources and compositions, that are less toxic and non-flammable than pure methanol and other solvents and allow for the addition of other micronutrients without precipitation, if needed to the carbon source, is not subject to premature degradation during use and storage by bacteria and other microorganisms, and possess the ability to reduce nitrates to nitrogen in the presence of denitrifying bacteria. Such alternate carbon sources include, but are not limited to carbohydrates such as glucose, fructose, dextrose, maltose, sucrose, other sugars, maltodextrins (CAS No. 9050-36-6), corn syrup solids (CAS No.68131-37-3) starches, and cellulose derivatives such as hydroxyethyl cellulose, hydroxypropyl cellulose, carboxymethyl cellulose and other carbon containing compounds.

Methanol in the above invention is used as a carbon source as well as a bacteriostat for the prevention of premature growth of extraneous bacteria and other microorganisms in the liquid carbon source. However, at low concentrations, methanol is generally not harmful for bacteria. In addition to methanol, a number of additives can be used to prevent premature microbial growth in the present invention. These additives can be used in addition to methanol or in the absence of methanol as a single component or combinations thereof. They include sodium hydroxide, sodium carbonate and sodium bicarbonate, and other bases with pH greater than 9. Other additives are nitro substituted compounds such as 2-Bromo-2-nitropropane-1,3-diol (CAS#52-51-7), 5-Bromo-5-nitro-1,3-dioxane (CAS#30007-47-7)-Bromo-nitropropane-1,3-diol (CAS#52-51-7); Isothiazolones such as 5-Chloro-2-methyl-4-isothiazolin-3-one (CMI) (CAS#26172-55-4), 2-Methyl-4-isothiazolin-3-one (MI) (CAS#2682-20-4), Mixture of CMI:MI 3:1 (CAS #55965-84-9, 1,2-Benzisothiazolin-3-one (CAS#2634-33-5); Quaternary ammonium compounds such as benzyl-C8-18 alkyldimethyl ammonium chloride and Benzylalkonium chloride (CAS #, 61789-74-7,8001-54-5,68393-01-5,68424-85-1,85409-22-9), N,N,N,-trimethyl-1-hexadecane ammonium bromide (CAS #57-09-0), N,N,N,-trimethyl-1-hexadecane ammonium chloride (CAS #112-02-7), 1-(3-Chloro-2-propenyl)-3,5,7-triaza-1-azoniatricyclo(3.3.1.1) decane chloride (CAS #9080-31-3, 4080-31-3,51229-78-8); parabans such as Butyl-4-hydroxybenzoate (CAS #94-26-8), Ethyl-4-hydroxybenzoate (CAS #120-47-8), Methyl-4-hydroxybenzoate (CAS #99-76-3), Propyl-4-hydroxybenzoate (CAS #94-13-3). Other substances that may be used are 2,2,4'-Trichloro-2'-hydroxyphenylether (CAS #3380-34-5), Sodium Benzoate (CAS #532-32-1), Benzyl alcohol (CAS #100-51-6), Chloroacetamide (CAS #79-07-2), N-(1,3-Bis hydroxy methyl)-2,5-dioxo-4-imidazolidinyl)N,N'-bis(hydroxy-methyl) urea(Diazolidinyl urea) (CAS #35691-65-7); 1,2-Dibromo-2,4-dicyanobutan (CAS #35691-65-7), 4,4-Dimethyl oxazolidin (CAS #51200-87-4), Glutarldehyde (CAS #111-30-8), formalin, 37% formaldehyde (CAS #50-00-0). Other additives that may be also be used are sodium hydroxymethyl glycinate (CAS#7732-18-5), imidazolidnyl urea (CAS #39236-46-9), diazolidinyl urea (CAS #78491-02-8) and 3-iodo-2-propynyl butyl carbamate (CAS #55406-53-6). The above additives are added at a concentration such that premature bacterial growth is prevented in the aqueous carbon solution, and yet will not kill or inhibit the bacteria when added for the microbiological remediation reactions. The useful concentration range will vary for each compound, and may be expected to be in the 0.01% to 5% range.

Another embodiment of the invention is the use of enzymes, biological and chemical catalysts, and bacteria that will convert a useful precursor carbon or electron donor source, such as cellulose, grease, fat, oils, aliphatic and aromatic hydrocarbons, to a useful carbon or electron donor source, such as glucose, fructose, glycerol, fatty acids, alcohols, by the use of the respective enzymes, biological or chemical catalysts, or microbes. For cellulose, the enzyme cellulases or microbial cellulases may be used. These cellulases and microbial cellulases may also be added along with the nitrifiers to the anaerobic or aerobic zone, or even into the settling tanks before the aerobic zones. Other enzymes that may be used in addition to cellulase are amylase, protease, lipase, carbohydrases and combinations thereof. For esters, fats and oils, enzyme esterases may be used.

Grease, fats and oils are discharged into water treatment systems, and grease and fat traps are sometimes employed to remove these materials. Costs are incurred at regular intervals for the removal and disposal of grease and fats from these traps, especially by users processing food. For the treatment of grease, fats and oils, the enzyme lipases, lipase releasing bacteria or bacteria capable of breaking down grease and fats could be used. These would convert the grease, fats and oils to glycerine, fatty acids, mono- and diglycerides. The breakdown products can then be diverted to the aerobic or anaerobic regions of the waste water treatment system, and can perform as an additional source of electron donor or carbon for nitrification or denitrification.

For aliphatic and aromatic hydrocarbons, and compounds, enzymes and bacteria which convert these materials may be used. The products of these transformations may then be directed to another zone of the water treatment process as a reactant.

The pollutant may be a process waste product such as cyanide. In such a case a cyanide converting enzyme, a cyanidase may be used, as described in U.S. Pat. No. 5,116,744 issued to Ingvorsen et al.

The carbon or electron donor source preferably should be in the liquid form so that the apparatus can deliver known volumes at predefined flow rates. If the carbon or electron donor source is in the solid form, solid or powder delivery methods should be employed. In the liquid form the carbon or electron donor source provides flexibility as to the addition of micronutrients without precipitation or undue agglomeration. In the case of methanol which is commonly used, micronutrients cannot generally be added without precipitation, and many other components are not soluble in methanol. Even though pure or concentrated methanol or other organic solvents may be used as the carbon or electron donor source in the present invention, the apparatus may still be used with modifications for appropriate use. The electron donor source is not limited to carbon containing compounds. Any electron donor source, including inorganic electron donors such as hydrogen gas, methane, natural gas, sulfide, sulfite, and iron (III) may be used.

Another embodiment is the use of enzymes which can be genetically modified to be present in crops such as potatoes, corm and other crops, so that these can convert starch directly into electron donors, and used without further treatment.

The liquid carbon sources are made by dissolving solid or liquid carbon sources in water, and adding bacterial stabilizers to prevent premature bacterial growth, and micronutrients as needed. An example of a useful composition is about 100 g of carbohydrates mixture containing about 7.6% monosaccharides, 6.9% disaccharides, 7.0% trisaccharides, 6.8% tetrascaacahrides and 71.7% tetrasaccharides and higher saccharides dissolved in 100 ml water. In addition, stabilizing agents to prevent premature microbiological growth described earlier, may be added, as well as other carbon sources which will increase the carbon content, and increase stability to microbiological growth. Examples are methanol, ethanol, ethylene glycol and glycerol, which may be added from about 3% to 40% or more as needed, without compromising flammability and solubility. Furthermore, micronutrients such as minerals, vitamins, other carbohydrates, and amino acids may be added to the aqueous carbon mixture, as needed, without precipitation. The composition and concentration of the mono and polysaccharides may be changed depending on the requirements of viscosity and concentration of the carbon or electron donor source. The monosccharides that can be used are glucose, galactose and fructose. The disaccharides that may be used are sucrose, lactose and maltose. Monosaccharides and disaccharides will provide a carbon solution with lower viscosity, whereas the use of oligo and polysaccharides will provide a higher viscosity for the same carbon concentration. While it is convenient to use soluble carbon or electron donor sources, in cases, it may be useful to use partially soluble carbon or electon donors which gradually dissolve or breakdown by microbes or enzymes to release material at a controlled release rate. An example would be the use of soluble oligosaccharides, polysaccharides as well as insoluble polysccharides, such as starch, or monosaccharides and polysaccharides formulated for controlled release in aerobic and anaerobic zones.

For nitrification, the apparatus is set to deliver growing nitrifying bacteria in the rapidly growing phase of growth or the end of the rapidly growing phase of growth, called the log phase of growth, to the inlet of the aerobic tank or chamber of the wastewater treatment process, but after the settling tank or the primary treatment. In addition, the apparatus has an air pump to deliver additional air to the aerobic tank or chamber. The air pump may input air by means of a distributing means such as an air diffuser. The apparatus can optionally deliver carbon and nutrients if needed for the particular process or system, based on the composition of the waste water and the stage of the treatment.

Since the bacteria are grown on the liquid carbon source of the invention, the liquid carbon source and composition may be considered to be a nitrifying and denitrifing bacterial induction media. The bacteria specifically grown in this invention is expected to be more efficient in the nitrification and denitrification metabolism This invention also relates to a method for selecting for enzyme function in nitrifiers and denitrifiers to be available down stream in a septic system when re-exposed to the same carbon carbohydrate source. It is well known in the field of microbiology that specific requirements are needed to grow and maintain microbes. It has been shown that maintaining microbes on the same carbon source maintains a high level of induction of the appropriate enzymes needed to utilize that carbon source at a high rate of efficiency. This manifests itself in competitive utilization of the carbon source. More specifically this invention using specific carbohydrates and other nutrients such as nucleic acid fragments may be used to transform microbial communities towards nitrification and denitrification in a more consistent and rapid manner. The invention is of significant interest for the nutritional improvement of sewage related microorganisms as well as methods for obtaining the expression of particular enzymes in sewage related nitrifying and denitrifying microorganisms.

For denitrification, the apparatus is set to deliver growing denitrifying bacteria in the rapidly growing phase of growth or the end of the rapidly growing phase of growth, called the log phase of growth, to the inlet of the anaerobic tank or chamber of the wastewater treatment process where anoxic conditions are present, but after the aerobic tank or chamber. The apparatus can optionally deliver carbon and nutrients if needed for the particular process or system, based on the composition of the waste water entering the anoxic or anaerobic chamber.

In some waste water systems the aerobic or oxic and anoxic or anaerobic chambers may not be clearly separated. In such systems, mixtures of nitrifying and denitrifying bacteria are added along with carbon and nutrient sources if the system lacks such ingredients.

The location of the delivery of the bacteria and carbon sources in the reaction zones is important. For nitrification and denitrification, nitrifying bacteria and electron donors, if needed, should be added in the aerobic zone; for denitrification, in the anaerobic zone, in those regions where the oxygen concentration is lower than other regions in the zone. In addition, both the aerobic and anaerobic zones may contain mixing means such as stirrers or mixers for dispersion of the contents.

It is therefore an object of the present invention to provide a waste water treatment apparatus and process that takes advantage of the useful characteristics of biological treatment in an effective manner. It is also an object of the present invention to provide such an apparatus and process that maximizes the contact between contaminants from the waste water and the microbes. This allows inefficient systems to become efficient without the need for a relatively large processing tank or unit for smaller systems. Another object of the present invention is to provide a waste water treatment apparatus and process that is sufficiently effective so as to reduce to desirable levels the Total Suspended Solids (TSS), Biological Oxygen Demand (BOD), *E-Coli*, nitrogen-containing compounds, phosphorus-containing compounds, bacteria and viruses of waste water in a cost-effective manner.

These and other objectives are achieved in the present invention through an aerobic and anaerobic treatment process including the addition of specific microbes and carbon to specific locations in the aerobic and anaerobic process so that the aerobic and anaerobic processes are made efficient. The aerobic and anaerobic process may be homogeneous such as the absence of any fixed film or added suspended media, or in addition may contain fixed film or other added suspended media for a heterogeneous process, for extra locations (surface area) for the added microbes to attach and grow. In such systems, either microfiltration or ultrafiltration membranes may be used to contain the bacteria within the aerobic or anaerobic zone and remove the effluent through the membrane. If suspended media is used, screens or filters may be employed at the end of the aerobic and anaerobic zones or tanks to contain the added suspended media within the zone or tank and prevent washout, and membranes may also be used to separate suspended microbes. In addition to the specific microbes, specific carbon sources and nutrients also can be added which provide additional efficiencies to the waste treatment process. The microbes and nutrients may be added at the specific locations in a batchwise, periodic or a continuous process using an apparatus. The microbes, carbon sources, nutrients and if necessary oxygen from air may be added together or separately in the process. Heating means may be provided to maintain the aerobic and anaerobic zones in a desirable temperature range of between 10 and 37 degrees F. In addition, the timing and delivery of the microbes, nutrients and temperature are optimized for the particular process. An example of the micronutrients that may be used is described in Micronutrient Bacterial Booster, N-100, Bio-systems Corporation, Roscoe, Ill., containing the minerals described. Minerals, vitamins, carbohydrates, and amino acids may be added together, separately, or mixed with the carbon source, or microbes as needed. The efficient timing and delivery of the microbes, carbon and nutrients are achieved by the use of a specific apparatus, a controller, which forms part of the invention. This efficiency in the process results in efficient depletion of wastewater contaminants from existing systems and meet regulatory requirements imposed by regulatory agencies.

DETAILED DESCRIPTION OF THE INVENTION

Figure 1:
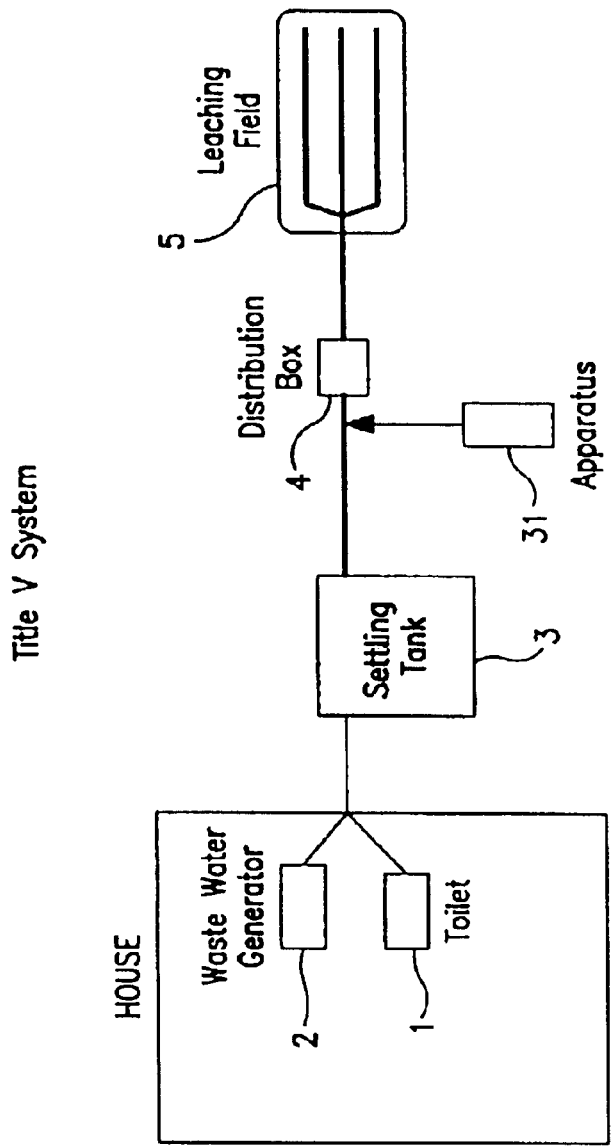
FIG. 1 is a schematic illustration of the apparatus in accordance with one embodiment of the present invention.

The introduction of bacteria before or in the initial settling phase of treatment requires the bacteria to survive a significant time period, usually measured in days, in a hostile environment. The settling period provides significant challenges to survival due to the physical processes during settling. Settling also promotes the removal of larger particles that can significantly delay complete treatment due to the large mass of the particle to the size of the bacteria. After settlement, the volume to be treated is dampened in peaks and easier to treat because particle size is reduced. Typically in the art batch pulses are fed into a system on the input end through either sinks or toilets. In accordance with the present invention, a (small) pump and actively growing microbes are placed in the post settling tank or primary treatment area as shown in FIG. 1. The process uses a combination of nitrifiers to convert ammonia to nitrites and nitrates, and denitrifiers to convert the nitrites and nitrates to nitrogen. Preferably the microbes are in log growth phase at the time of delivery, and growing microbes and nutrients are delivered either in a batch wise, periodic or continuous manner. This is different from prior art methods where microbes in static state, non-actively growing phase or spore form are added at the input locations, where growth is slow, and the microbes may have insufficient time or nutrients to grow before they are washed out of the holding and settling tanks due to insufficient "dwell" or "residence" times. Many of these systems also require either fixed or suspended media for functioning. The use of growing microbes ensures that the density of microbes available per unit volume is very high, and therefore the volume of the tanks needed for a particular treatment will be much smaller than current waste water systems. In addition, for the same treatment tank size, the efficiency of removal of nitrogen would be enhanced, resulting in cost savings. Furthermore, in fixed film and suspended film media, there will be continuous replacement of dead and buried bacteria on the surface with fresh and growing bacteria to enhance the performance of the wastewater treatment. The tanks, in addition may contain mixing means, either by mechanical mixers or fluid mixers, for uniformly dispersing the contents added by the controller.

An additional feature of this invention is the use of heating means to maintain the temperature of the tanks or containers at the optimum temperature for the transformation and removal of the unwanted contaminants. The control means for maintaining the temperature at the optimum temperature is either included in the controller, or is provided separately, and forms part of this invention In addition, because the microbes and nutrients are added in a controlled process, there is less likelihood of microbes not surviving. The problem of runaway growth when excessive microbes are added to settling tanks resulting in plugs and blocks of filters or tanks also is minimized. Furthermore, a particular amount of active microbes is always present, making the system catastrophic failure proof, such as in the case when toxic chemicals react with the microbes, or when the microbes are washed out in the case of rainstorms or flushes.

The particular microbes chosen depend on the nature of the waste to be cleaned, and are within the skill in the art. Generally the microbes include nitrifying bacteria for the conversion of ammonia to nitrites and nitrates. The denitrifying microbes are denitrifying bacteria that convert the nitrates and nitrites to nitrogen in the presence of the carbon sources and nutrients added in a controlled process. Those skilled in the art know the nature of the nutrients most effective for supporting the microbes chosen. The examples below provide examples of suitable microbes. Some of the microbes can be microbes that transform phosphorus to another form that may be easily removed for example by precipitation or sedimentation. Some others will be specific for impurities such as the removal of biological oxygen demand by the removal of carbon or other oxidizable impurities which can interfere with the nitrification.

The invention is equally applicable for the remediation of waterbodies, such as ponds, lakes, aquaculture facilities, landfills, industrial wastes, and contaminated sites. A homogeneous system or a heterogeneous fixed film or suspended media may be used as appropriate. In the case of waterbodies the water can be recycled through a series of aerobic reactors aerobic to convert ammonia to nitrates and nitrites, and an anaerobic reactor to convert the nitrates and nitrites to nitrogen. In the case of industrial wastes, an appropriate microbe specific to the pollutant should be employed. In the case of contaminated soils and waste sites, water would be used to wash or percolate the site and sent to one or more vessels containing microbes and receiving growing microbes introduced by the controller. In addition, the containers and the controllers may be mounted on mobile platforms.

In the case of contaminated waste sites, such as perchlorates and chlorinated hydrocarbons, the concentrations of the contaminant may be too high in general for microbes to survive for longer periods. The continuous or periodic addition of growing microbes as described in the invention overcomes this deficiency. Any growing microbe that transforms a particular contaminant can be used. Microbes may be modified genetically to contain genes encoding enzymes that are effective in transforming the contaminants. Some examples of contaminants that may be removed or transformed by the invention by the controlled addition of microbes and if needed other nutrients are, Acetone, Ammonia, Aniline, Aromatic compounds, Nitrate, Nitrite, Carbon disulphide, Chlorinated solvents, Chlorobenzenes, Chloroform, Dichloroethanes, Dinitrotoluene, Dioxane, Ethanol, Ethylene, Explosives, Glycols, Hydrocarbons, Hydrogen sulfide, Isopentane, Isobutanes, Methanol, Methyl chloride, Methylene chloride, Tri nitro toluenes, Naththalene, Nitraamines, Nitrate, Nitroaromatics, Nitrites, Nitrobenzene, Perchlorates, Perchloroethylene, Pesticides, Phenol, Solvents, Styrene, Sulfur compounds, Tetrahydrofuran, Trichloroethane, Trichlorotoluene, Bromoform, Nitrobenzene, Methyl tertiarybutyl ether, Tertiary butyl alcohol, Chlorinated ethenes, Chlorinated ethanes, Vinyl chloride, Ammonium perchlorate and perchlorates.

The preferred carbon/electron donor source is methanol, carbohydrates and sugars and mixtures thereof. Other carbon sources that may be used are ethanol, polysaccharides, soluble starches, oils, fats, dairy and food waste, and other sources of organic carbon. The amount of carbon that should be added is about 0.2 to about 5 times the total nitrogen present in the waste water, preferably about 2 times the total nitrogen present in the waste water.

The preferred nutrients are amino acids, phosphates, and other minerals needed by bacteria for growth.

The preferred bacteria to be used are specific for the pollutant to be treated. For denitrification, denitrifying bacteria are used. If nitrification of ammonia is the need, nitrifying bacteria would be used, and for cyanide removal "cyanidase" enzyme or bacteria capable of converting cyanide can be used. For denitrification, a mixture of Enterobacter Sakazaki (ATCC 29544), *Bacillus coagulans* (ATCC7050), *Bacillus subtillis*(ATCC 6051), *Bacillus subtillis*(ATCC 6051), *Bacillus megatarium*(ATCC7052), *Bacillus licheniformis*(ATCC14580), *Bacillus cerus* (ATCC4513) and *Bacillus pasytereurii*(ATCC 11859) may be used. Other bacteria that may be used are described in U.S. Pat. No. 6,025,152. For nitrification, the bacteria include Nitrobacter and Nitrococcus spp available from Cape Cod Biochemicals, 21 Commerce Road, Bourne, Mass. These bacteria are available from a number of commercial suppliers which are specific for the specific pollutant. The bacteria are used in an amount effective to treat (and preferably eliminate) the contaminants.

Turning now to FIG. 1, there is shown a simplified diagrammatic illustration of a preferred arrangement of the basic components of the waste water treatment system of the present invention for a small system such as a single family home. (Title V System). Waste generated in toilet (1) and water waste generator (2) enters the settling tank (3), and after a certain residence or "dwell" time enters the distribution box (4) which distributes to the leaching field. The distribution box can be a large tank with two zones, one for receiving oxygen and be oxic and result in nitrification, and another anoxic for denitrification, or it could simply be one tank. In the present invention an apparatus (31), shown in greater detail in FIG. 2, is used to add growing microbes, nutrients including carbon sources, and oxygen after the settling tank, but before the distribution box for efficient nitrification and denitrification of waste.

The distribution box can be made large or small depending on the flow rate of waste water and the rate of addition of components from the apparatus (3).

Figure 2B:
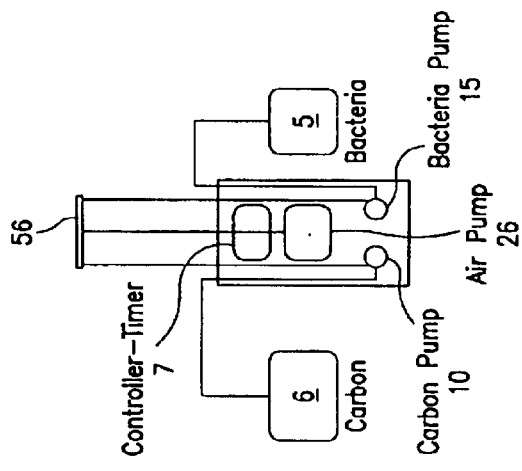
FIGS. 2A and 2B are a schematic illustration of a suitable apparatus for introducing bacteria in accordance with one embodiment of the present invention.
Figure 2A:
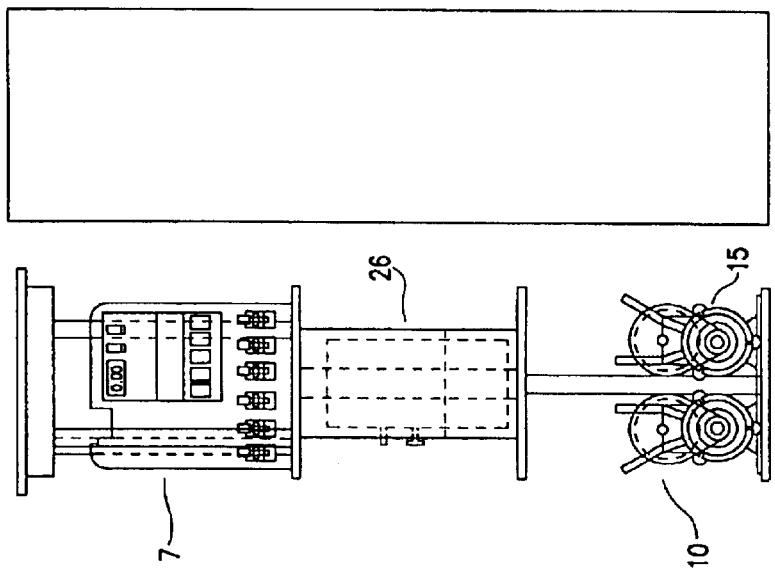

FIG. 2A is an expanded view of the apparatus called controller "Tommy Box", used for the addition of the carbon or electron donor source, nutrient, the biological microbial medium, and air used to accomplish effective aerobic and anaerobic waste water treatment. Growing microbes in bacteria holding tank (5) are pumped using bacteria pump (15) controlled by a controller-timer (7), to the exit point (56). Nutrient and carbon/electron donor source holding tank (6) feeds into the carbon/electron donor pump (10), controlled by the controller-timer (7), to the exit point (56). Air pump (26) controlled by the controller-timer also pumps air to the exit point (56). The exit point (56) of the apparatus is placed on line before the distribution box in FIG. 1. This allows for controlled predetermined feed of air, carbon, nutrients, and bacteria into the waste water flow before the distribution box. The controller timer allows for measured addition of microbes, nutrients, carbon and air. If needed, additional tanks and pumps may be installed in the apparatus for controlled addition of other ingredients for any other specific treatment.

FIG. 2B is another design of the apparatus called controller "Tommy Box". The timer, the carbon pump, and the bacteria pump, the carbon storage container, and the bacteria storage container are installed inside a box to protect from the elements. Additionally, a small thermostatically controlled heater is provided to keep the box at an optimum temperature for the bacteria and carbon.

Figure 3:
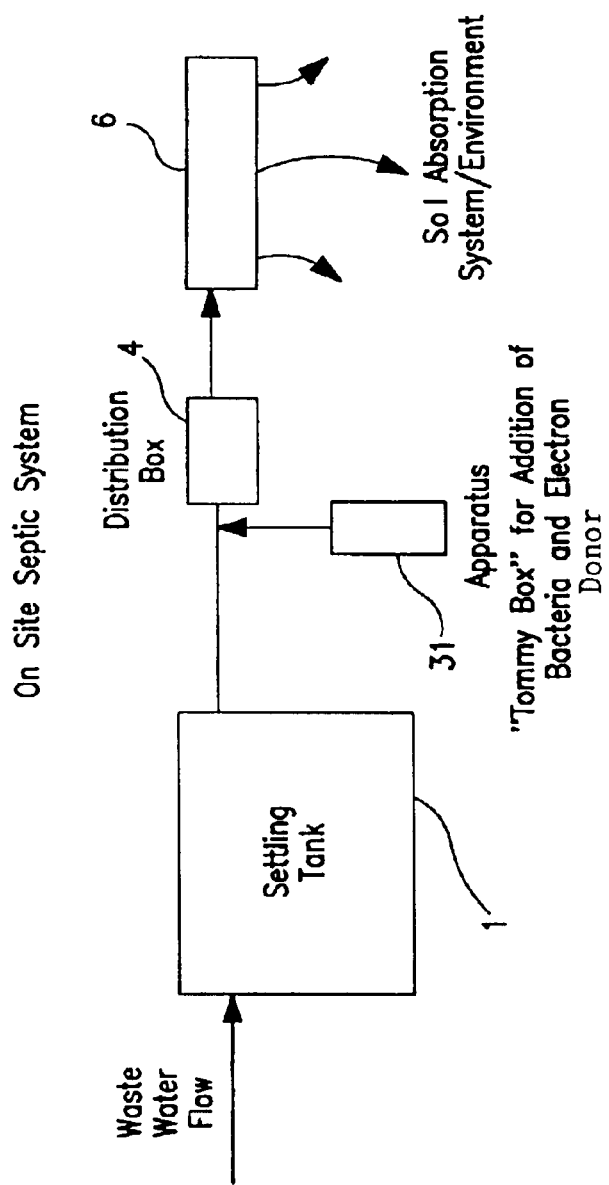
FIG. 3 is a schematic illustration of another waste treatment system including one embodiment of the apparatus of the present invention.

FIG. 3 is another embodiment of the invention where waste water flow into settling tank or septic tank (1), and flows into a distribution box (4) connected to receive input from Apparatus (31), which delivers controlled quantities of carbon, nutrient, bacteria, and air. The treated water finally flows into the soil absorption system (6).

Figure 4:
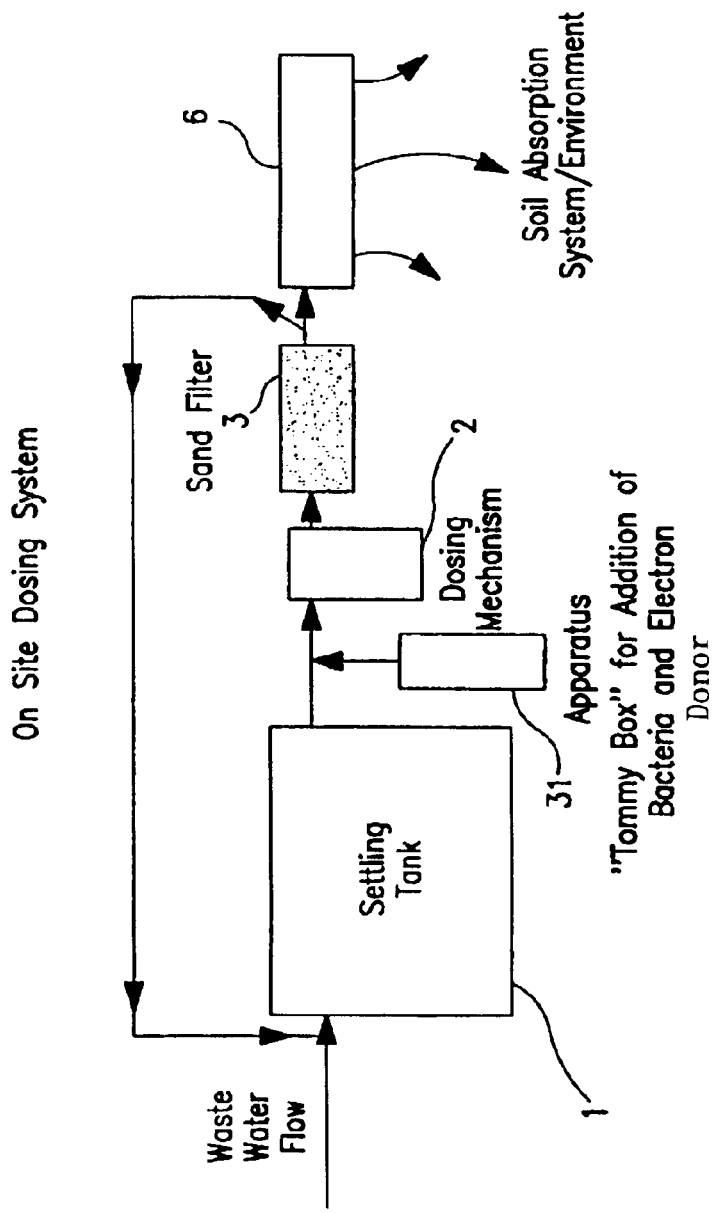
FIG. 4 is a schematic illustration of yet another waste treatment system including one embodiment of the apparatus of the present invention.

FIG. 4 is a preferred embodiment of the invention where waste water flow into settling tank or septic tank (1) and flows into a dosing mechanism section (2). A septic tank 1, or other form of primary settling tank or unit may be used for initial settling of large solids from the waste water initially transferred from some type of facility, whether a single-family residence, a grouping of buildings, or an industrial facility. The septic tank 1 may be an existing unit, or it may be provided as part of an integrated treatment system of the present invention. The present invention includes a primary treatment unit that is a dosing zone or mechanism, which receives the controlled addition of carbon or electron donor, nutrients, bacteria, oxygen and any other additive, using the apparatus (31) at the specific location or zone. For aerobic zones oxygen is provided, whereas for anaerobic zones, oxygen is not provided. The output from the apparatus (31) is preferentially introduced at the input side of the dosing mechanism. In some cases it may be advantageous to introduce the output of the apparatus midway into a zone or close to the bottom of the zone. The dosing mechanism may be replaced by a distribution box for a single-family residence, as shown in FIG. 3, or could be a dosing tank as described in FIG. 7. The output can then be further treated by a sand filter or sent to the environment or the soil absorption system.

The treated water that passes through the treatment system is then drawn off or otherwise moved to another site, such as a leach field, a secondary water user, such as a toilet, to a final usable water site, such as via a soak hose system, or it can be discharged to nearby water bodies.

The apparatus (Tommy Box) (31) introduces controlled quantities of carbon, nutrient, bacteria, and air into the dosing mechanism (2) section. The waste water then flows through a sand filter (3). A portion of the treated water may be diverted to the soil absorption system (6). Another portion of the treated water may be re-circulated using a flow mechanism to the input of the settling tank (1), and flows into a dosing mechanism section (2).

Figure 5:
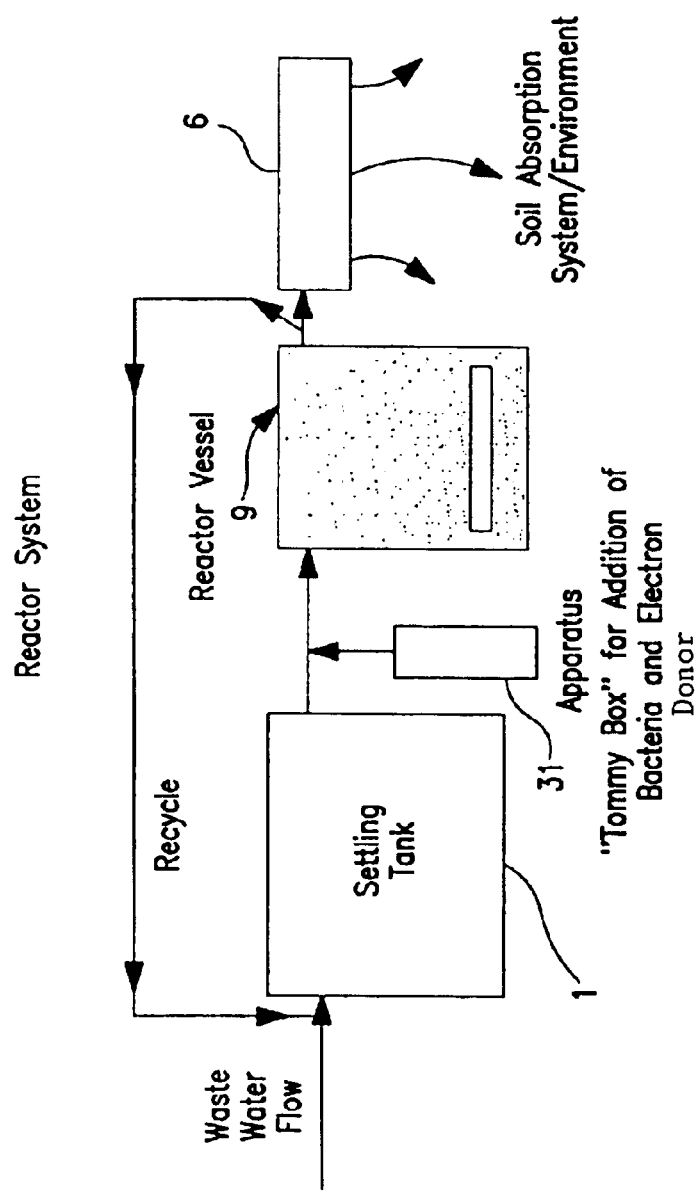
FIG. 5 is a schematic illustration of still another waste treatment system including one embodiment of the apparatus of the present invention.

FIG. 5 is another embodiment of the invention where waste water flow into settling tank or septic tank (1) and flows into a reactor (9). The apparatus (Tommy Box) (31) introduces controlled quantities of carbon/electron donor, nutrient, bacteria, and air into the input of the reactor vessel (9). A portion of the treated water may be diverted to the soil absorption system (6). Another portion of the treated water may be re-circulated using a flow mechanism to the input of the settling tank (1), and flows into a reactor (9). The apparatus (Tommy Box) (31) introduces controlled quantities of carbon, nutrient, bacteria, and air into the input of the reactor vessel (9). This process is repeated, and gives additional treatment time for the waste water.

Figure 6:
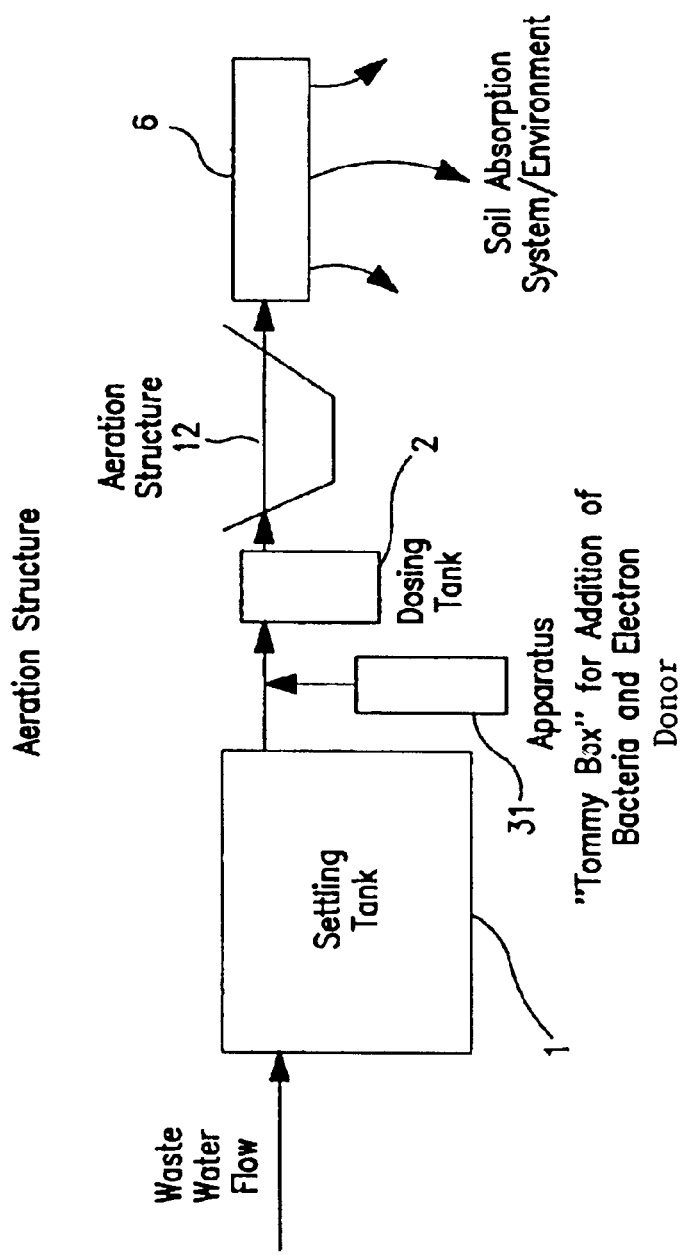
FIG. 6 is a schematic illustration of still another waste treatment system including one embodiment of the apparatus of the present invention.

FIG. 6 is another embodiment of the invention where waste water flow into settling tank or septic tank (1) and flows into a dosing tank mechanism section (2). The apparatus (Tommy Box) (31) introduces controlled quantities of carbon, nutrient, bacteria, and air into the dosing mechanism (2) section. The waste water then flows through an aeration structure (12) and is discharged to the environment. A variation is to treat the output using a sand filter before being discharged to the environment.

Figure 7:
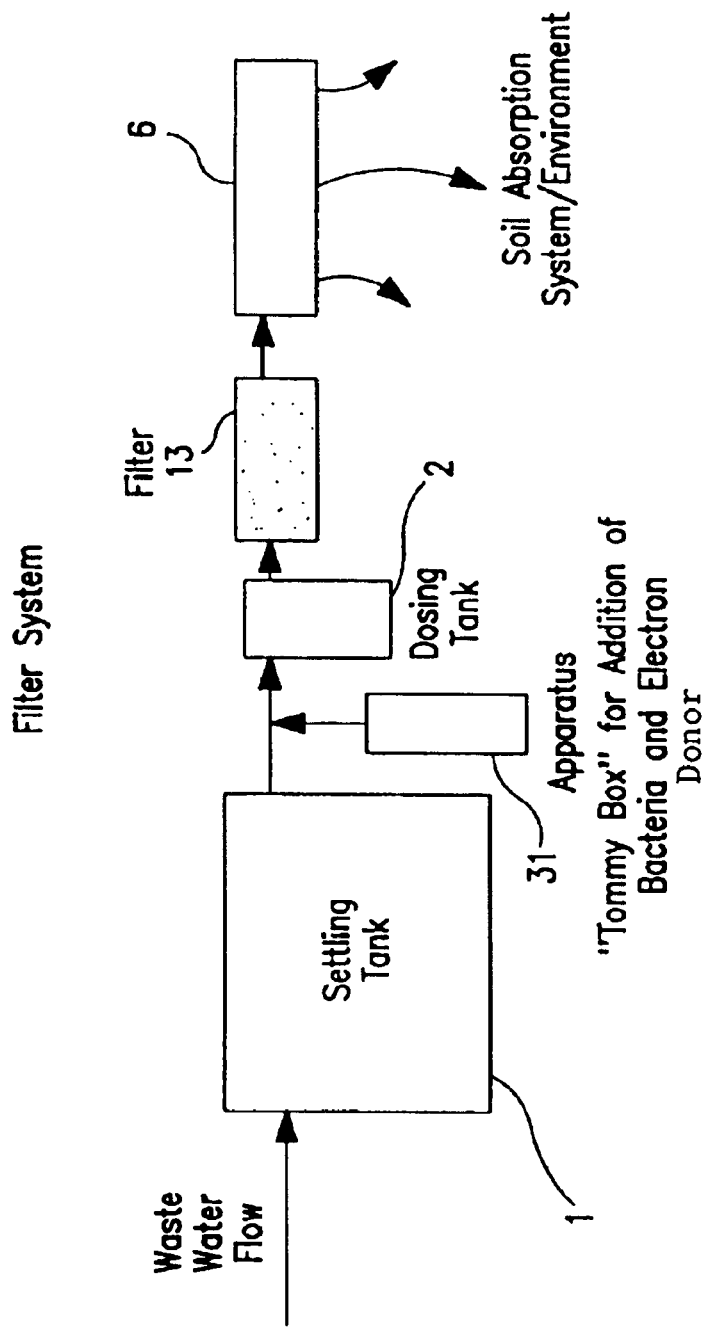
FIG. 7 is a schematic illustration of another waste treatment system including one embodiment of the apparatus of the present invention.

FIG. 7 is another embodiment of the invention where waste water flow into settling tank or septic tank (1), and flows into a dosing tank (2) connected to receive input from apparatus (31), (Tommy Box), which delivers controlled quantities of carbon, nutrient, bacteria, and air. The treated water finally flows into a RUKK Filter system (13), described in U.S. Pat. No. 4,465,594 and 5,588,777 (incorporated herein by reference) and finally to the environment.

Figure 8:
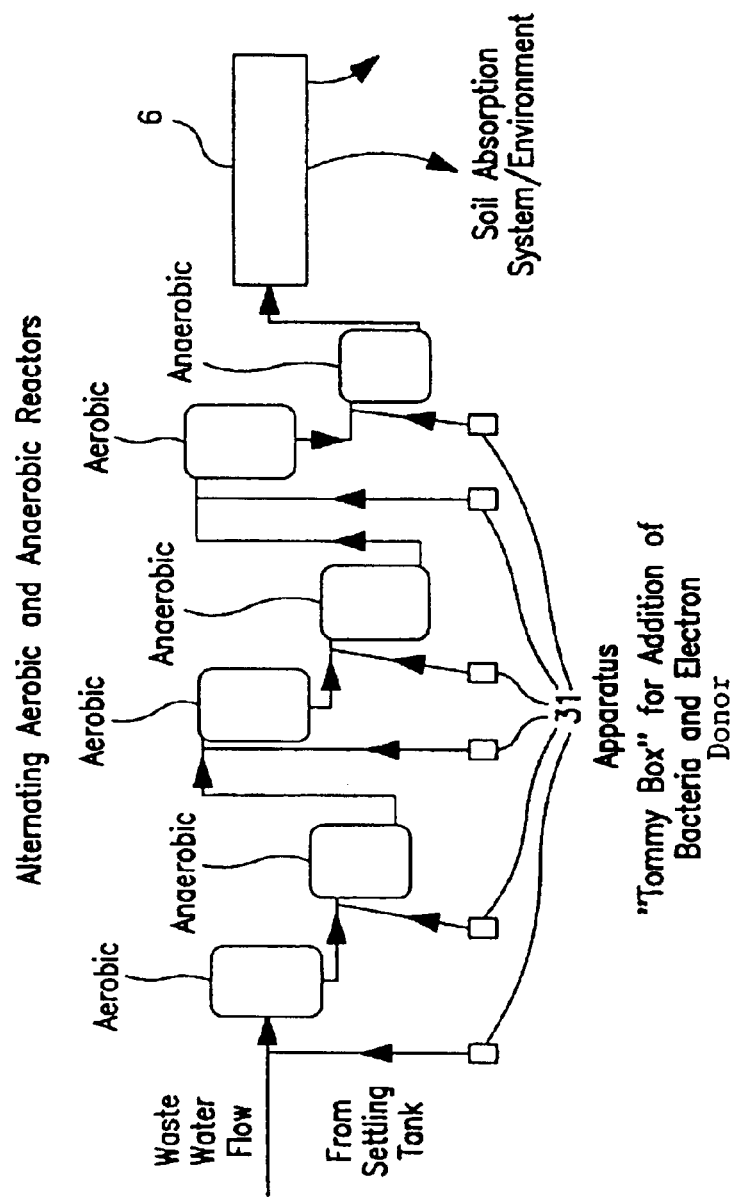
FIG. 8 is a schematic illustration of yet another waste treatment system including one embodiment of the apparatus of the present invention.

FIG. 8 is another embodiment of the invention where wastewater is treated using a series of alternating aerobic and anaerobic reactors or zones. The series of alternating aerobic and anaerobic reactors or zones can be any number as desired. At the inlet to one or all of the aerobic zones or reactors, the apparatus 31, "Tommy Box" delivers nitrifying microbes and oxygen. In this zone, ammonia is converted to nitrite and nitrate. If needed, carbon, nutrient or electron donors may also be added, if the waste water is deficient in the above ingredients. Denitrifying microbes, may also be added, if there are zones in the reactors that are anaerobic, and therefore can participate in denitrification, and thereby increase the efficiency of the nitrogen removal process.

At the inlet to one or all of the anaerobic zones or reactors, the apparatus 31, "Tommy Box" would be set to deliver denitrifying microbes, carbon or electron donor and nutrients. No oxygen is delivered to the anaerobic rectors or zones. The amount of carbon, electron donors, and nutrient added is related to the needs of the system. In this zone denitrification of nitrates and nitrites to nitrogen gas takes place. The discharge from the final anaerobic reactor could then be sent to the environment or for tertiary treatment. U.S. Pat. No. 4,279,753 issued to Nielson et al. describe multiple series of alternating aerobic-anaerobic bioreactors in series can utilize the current invention to improve the efficiency and dependability of such a wastewater treatment system. U.S. Pat. No. 6,235,196 issued to Zhou also describe multiple reactors which can utilize the improvements of the invention.

Figure 9:
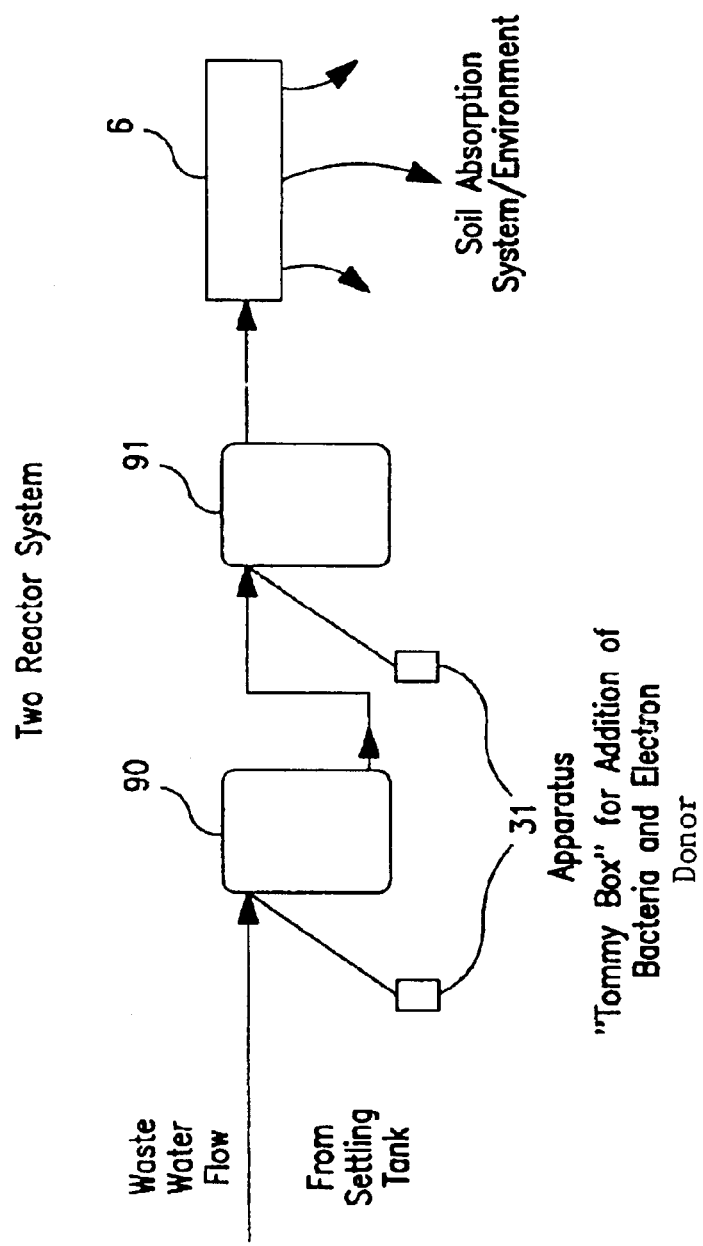
FIG. 9 is a schematic illustration of still another waste treatment system including one embodiment of the apparatus of the present invention.

In FIG. 9, if only two aerobic and anaerobic zones are needed, then only two apparatuses (31) feeding the inlets to the aerobic and anaerobic zones would be used. The size of the apparatus could be scaled based on the size of the reactors 90, 91, zones and the wastewater flow rates. The discharge from the anaerobic reactor could then be sent to the environment (6) or for tertiary treatment.

Figure 10:
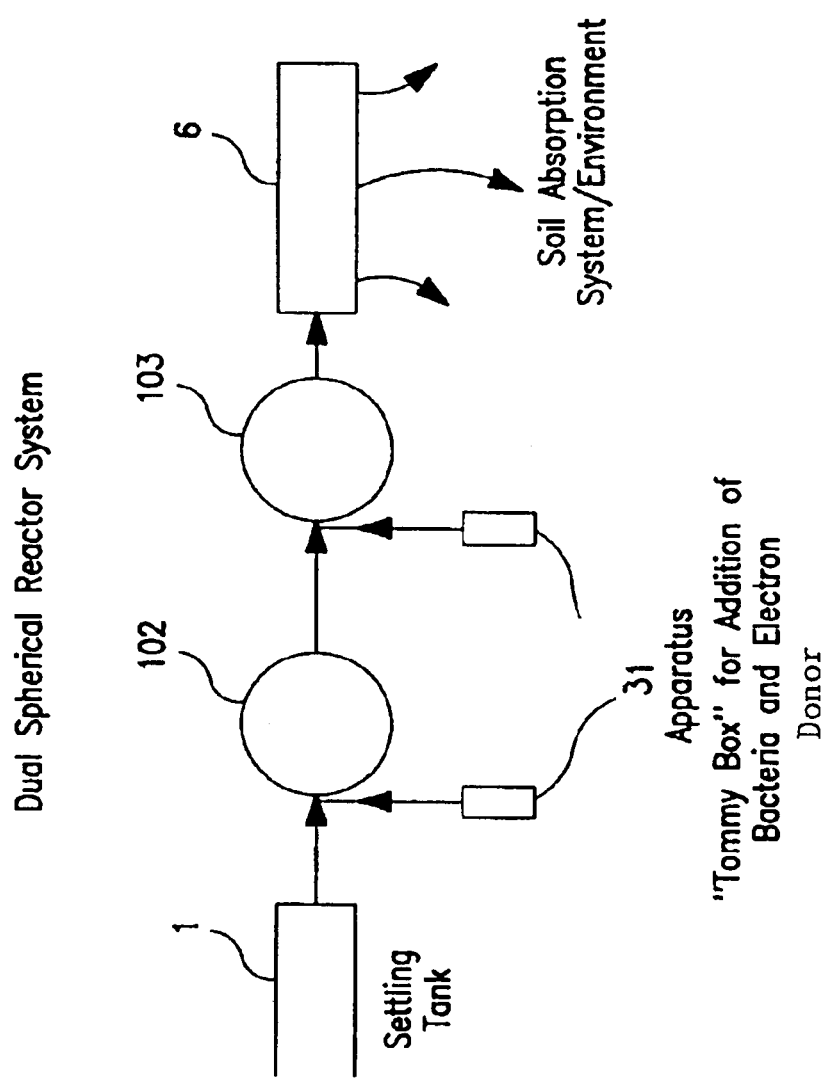
FIG. 10 is a schematic illustration of still another waste treatment system including one embodiment of the apparatus of the present invention.

FIG. 10. is a dual spherical reactor vessel embodiment where liquid wastewater flows into a settling tank or septic tank (1), and flows into a primary spherical reactor vessel (102) connected to receive input from apparatus (31), (Tommy Box), which delivers controlled quantities of nutrient, bacteria, and air. The output then flows to a secondary spherical reactor vessel (103) where nutrients and bacteria can be delivered into said vessel near the bottom, middle and top of the fluid. In the preferred example the reactor vessels should hold between 2 and 8 days of retained daily flow volume. The output of the secondary reactor vessel leads to the soil absorption system (6).

Figure 11:
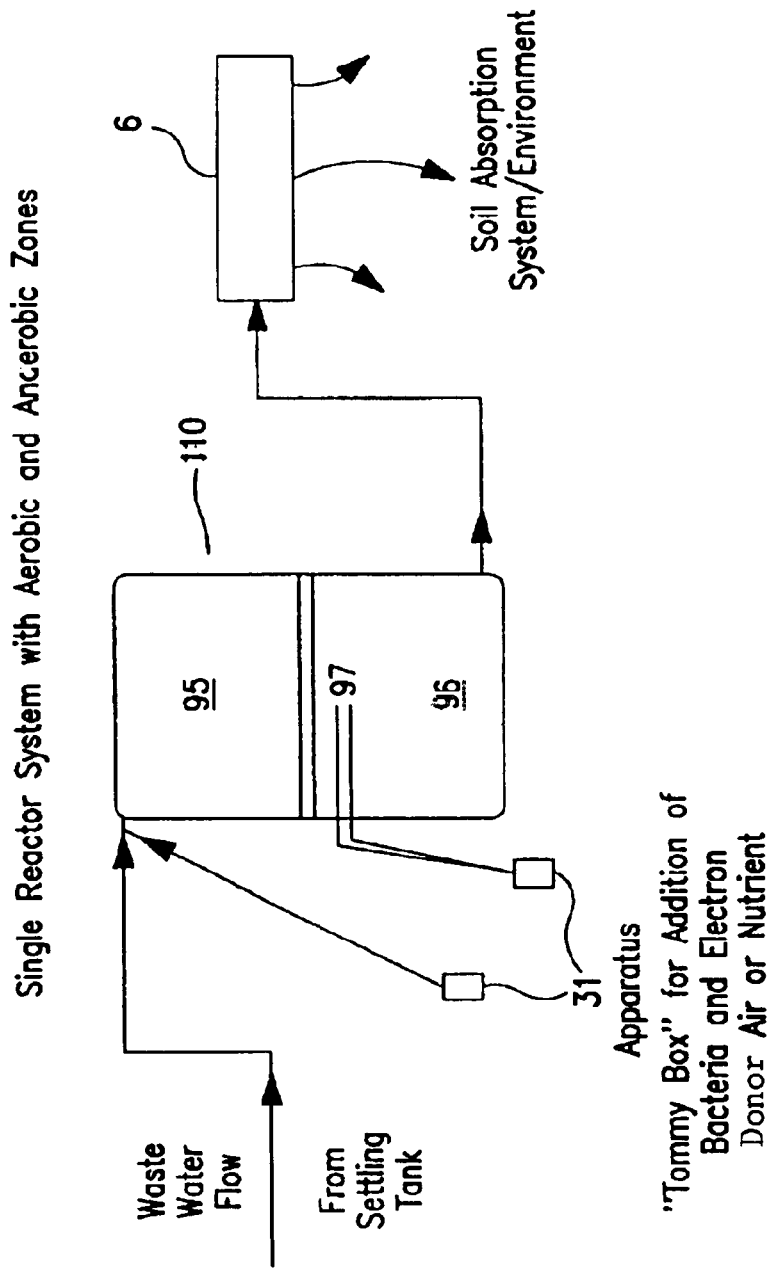
FIG. 11 is a schematic illustration of another waste treatment system including one embodiment of the apparatus of the present invention.

FIG. 11 is another embodiment of the invention wherein wastewater is treated using a single reactor (110) which contains both an aerobic (95) and an anaerobic (96) zone. The two zones may be separated by some mechanical means, or may be a two fluid regions not separated by mechanical means. At the inlet to the aerobic zone the apparatus (31), "Tommy Box" delivers nitrifying microbes and oxygen. If needed, carbon, nutrient or electron donors may also be added, if the waste water is deficient in the above ingredients. In this zone, ammonia is converted to nitrite and nitrate.

At the beginning of the anaerobic zone (96) where the two zones meet, a second apparatus 31, "Tommy Box" would be set to deliver denitrifying microbes, carbon or electron donor and nutrients using transfer means (97), which could be a tube. No oxygen is delivered to the anaerobic zone. The amount of carbon, electron donors, and nutrient added is related to the needs of the system. In this zone denitrification of nitrate and nitrites to nitrogen gas takes place. U.S. Pat. No. 6,086,765 issued to Edwards. describe a single aerobic-anaerobic reactor that can utilize the current invention to improve the efficiency and dependability of such a wastewater treatment system.

Figure 12:
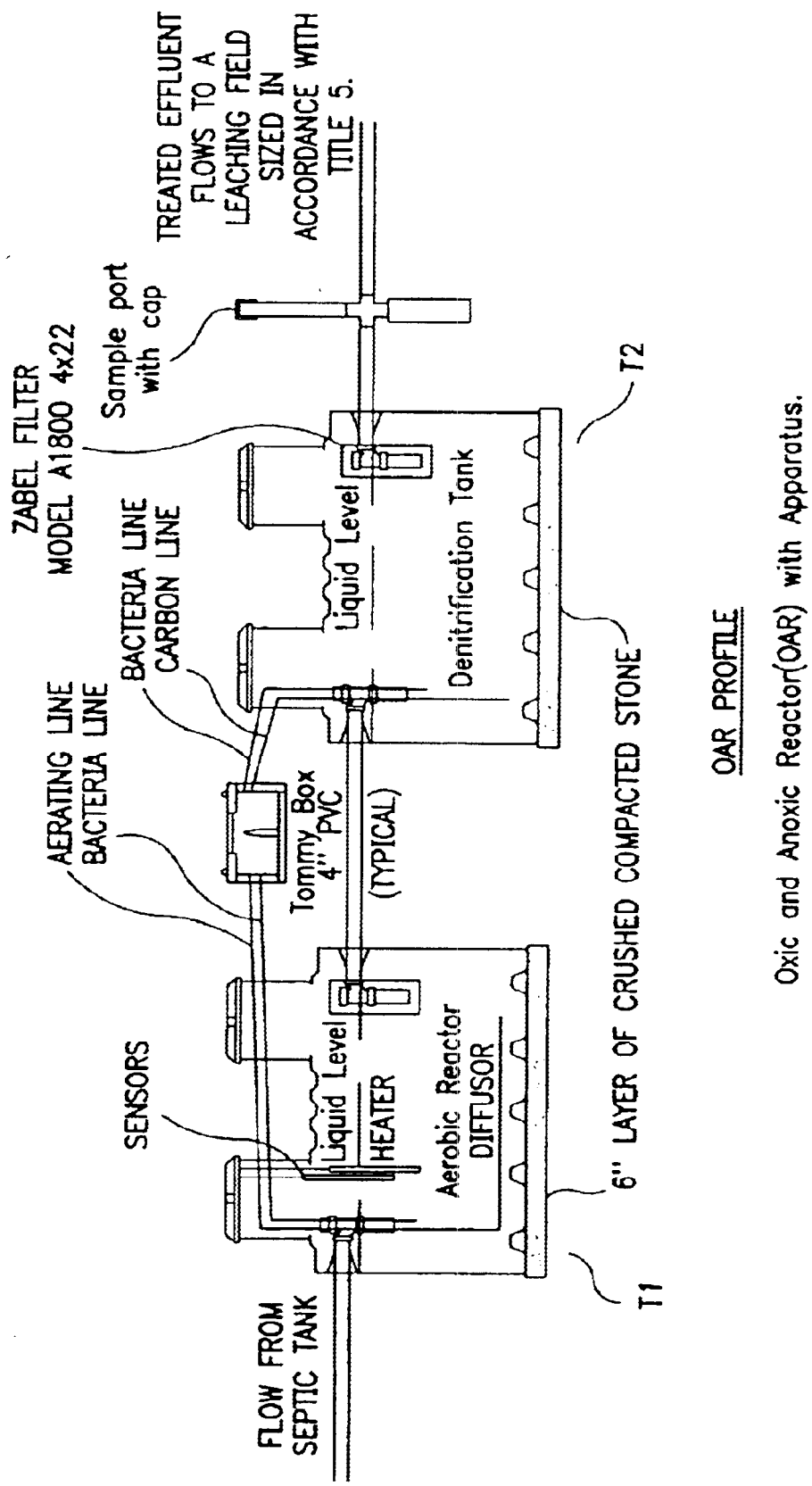
FIG. 12 is a schematic illustration shown an oxic and anoxic reactor with Apparatus ("Tommy Box") for the introduction of bacteria, carbon and air in accordance with one embodiment of the present invention.

FIG. 12 shows the Oxic and Anoxic reactor with Apparatus ("Tommy Box") with lines for the introduction of bacteria, carbon and air, the use of a heating means to heat the aerobic zone, and the use of filters in the fluid exit from the aerobic and anaerobic zones. Optional heating means may be introduced to the anoxic zone. Optionally, an additional reactor or zone may be added where the effluent leaving the anaerobic reactor or zone is aerobically treated with air to reduce the BOD before it is released to the soil absorption system or environment. Optional tanks for additional aeration, filtration by sand filter or other soil absorption system, ultraviolet treatment, ozone treatment and membrane filtration are not drawn.

In the aerobic and anaerobic zones a membrane filter (hollow fiber or other) may be used to remove effluent by filtration. The membrane prevents the loss of microbes from the anoxic reactor.

Figure 13B:
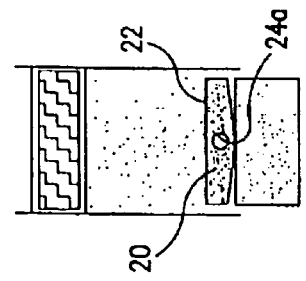
FIGS. 13A and 13B are a schematic illustration of an embodiment of the invention for a filter system.
Figure 13A:
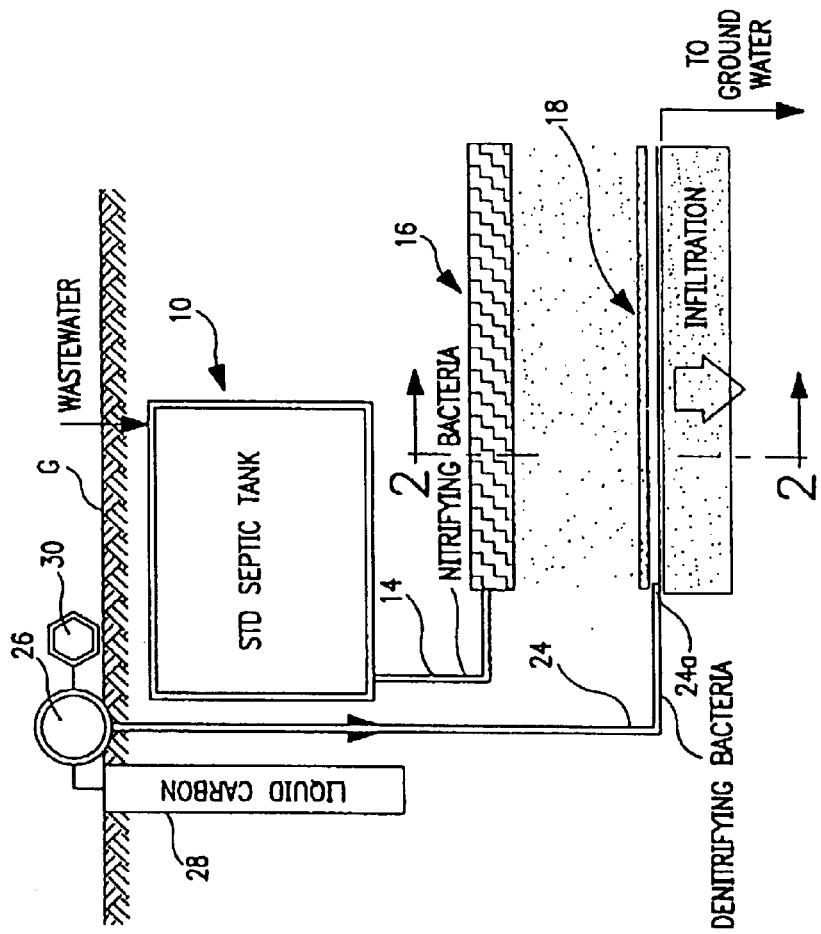

FIGS. 13A and 13B. Embodiment of the invention for a filter system. The system includes a holding tank 10 having an outlet 14 that draws nitrifying bacteria (from transfer apparatus) leading to a leaching field 16. A porous bed of sand or fine gravel is provided below the leaching field 16, and includes an in-drain 18 having a core 20 surrounded by an outer envelope 22 of geotextile fabric material. Conduit means 24 having a lower branch 24a that draws denitrifying bacteria (from transfer apparatus) is provided. The upper end of the conduit means 24 communicates with pump 26 that draws liquid carbon from a reservoir 28 in response to the output of a timer 30.

Figure 14A:
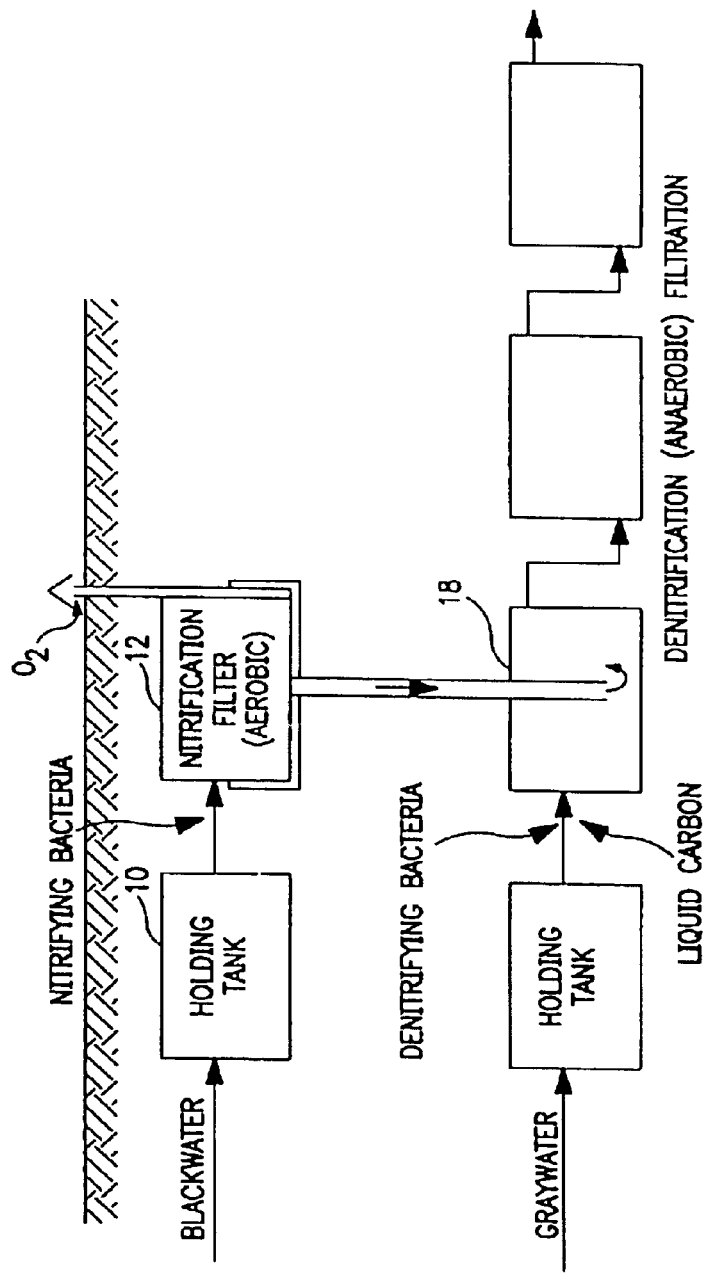
FIG. 14A is a schematic illustration of an embodiment of the invention for a modified nitrification/denitrification filter system.

FIG. 14A. Embodiment of the invention for a modified nitrification denitrification filter system.

Figure 14B:
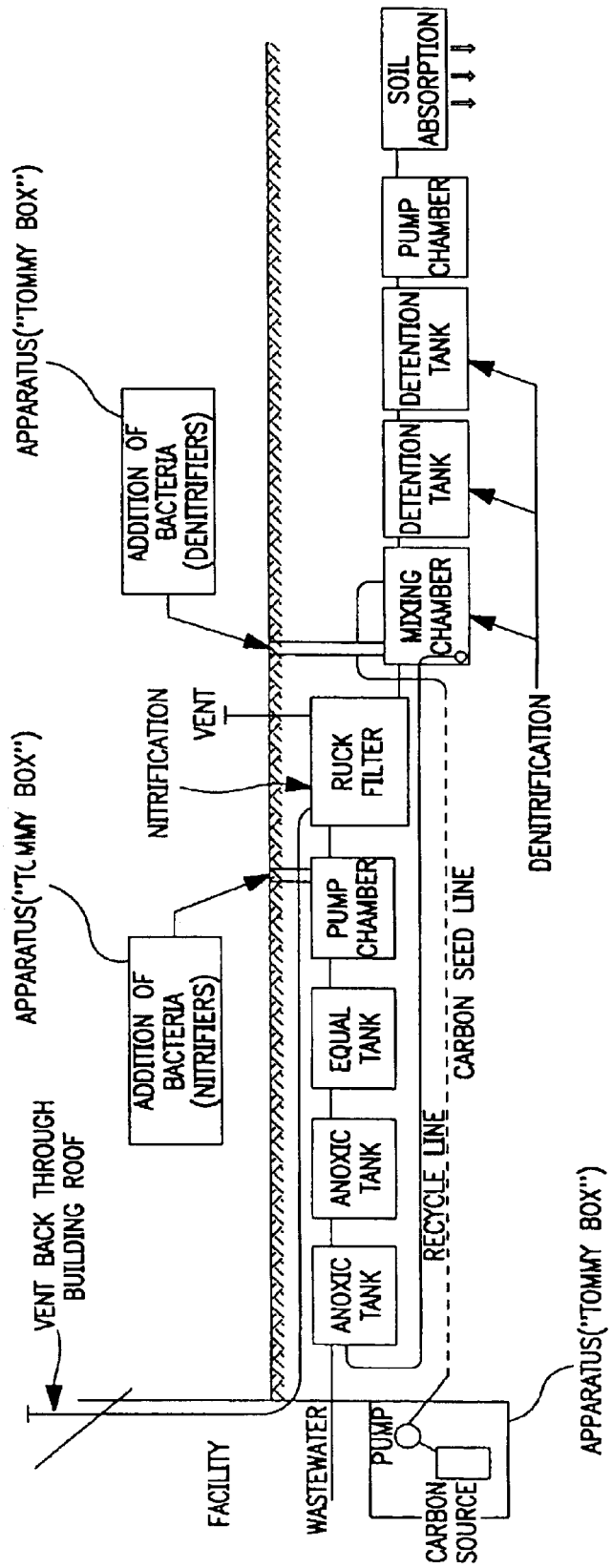
FIG. 14B is a schematic illustration of an embodiment of the invention for a modified nitrification/denitrification filter system.

FIG. 14B. Improved embodiment of the invention for a modified nitrification denitrification filter system.

Figure 15:
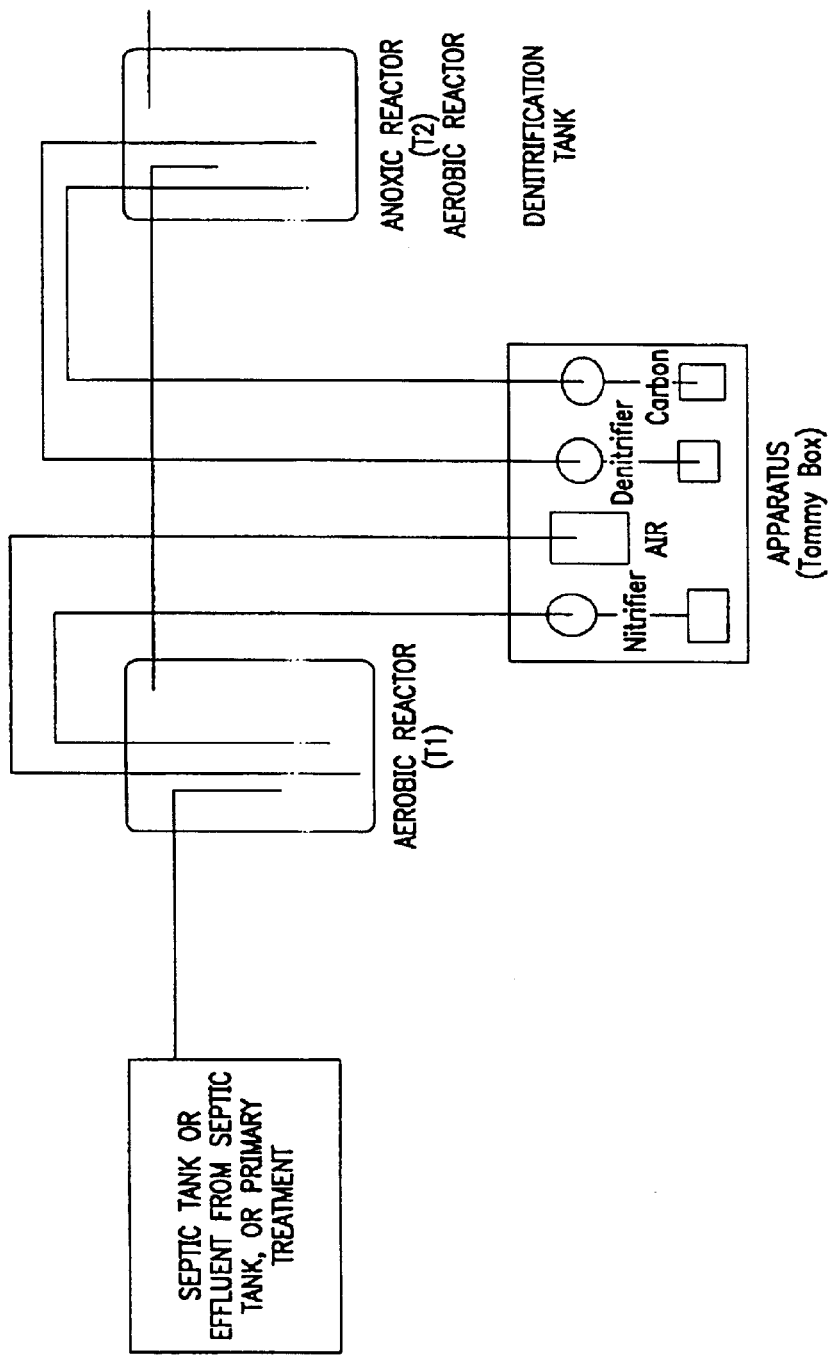
FIG. 15 is a schematic illustration of an embodiment of the invention for 1 liter reactors.

FIG. 15. Another layout for the apparatus for 1 liter reactors.

Figure 16:
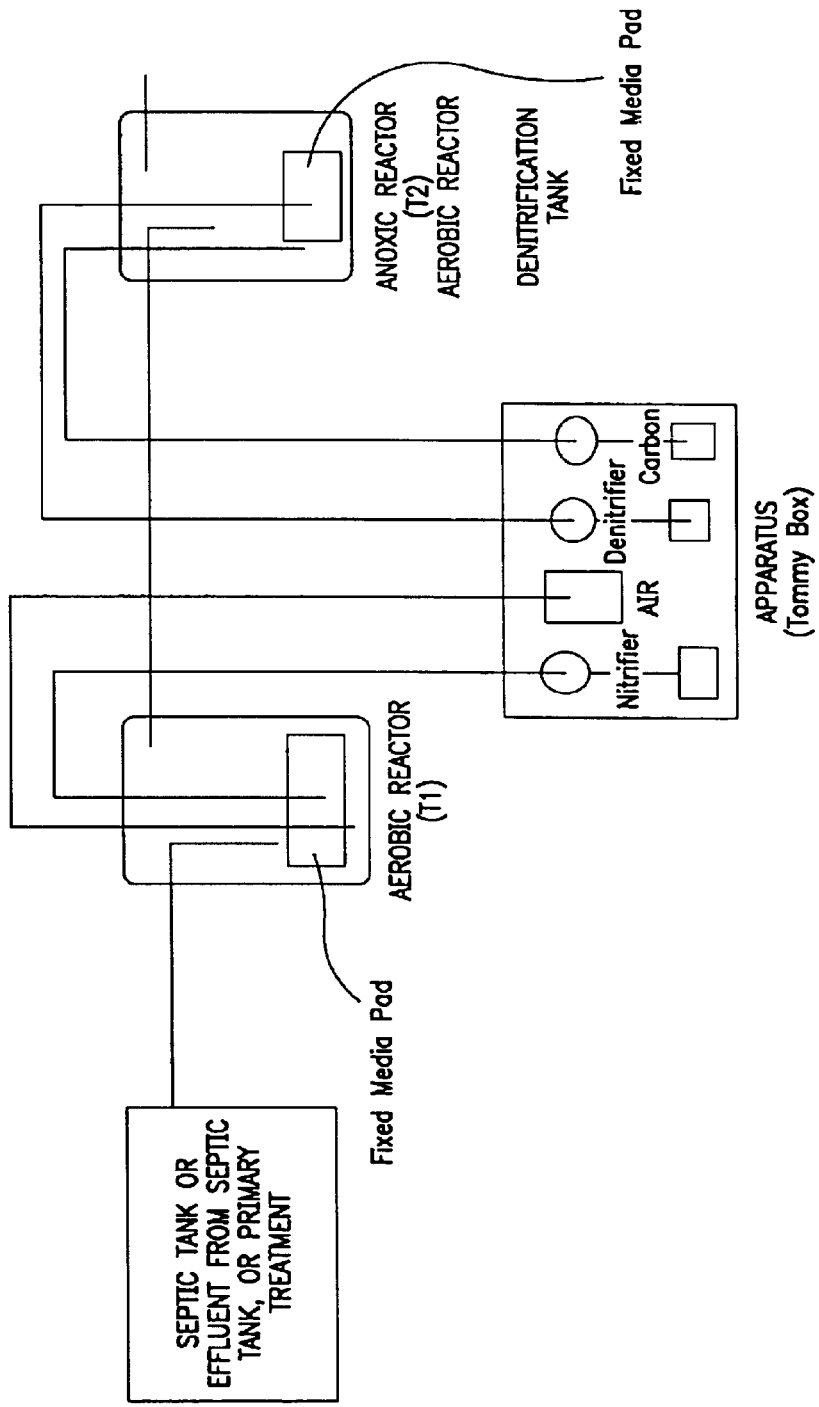
FIG. 16 is a schematic illustration of an embodiment of the invention for 1 liter reactors with fixed media in the oxic and anoxic reactors.

FIG. 16. Layout for Apparatus shown for 1 liter reactors with fixed media in the oxic and anoxic reactors.

Figure 17:
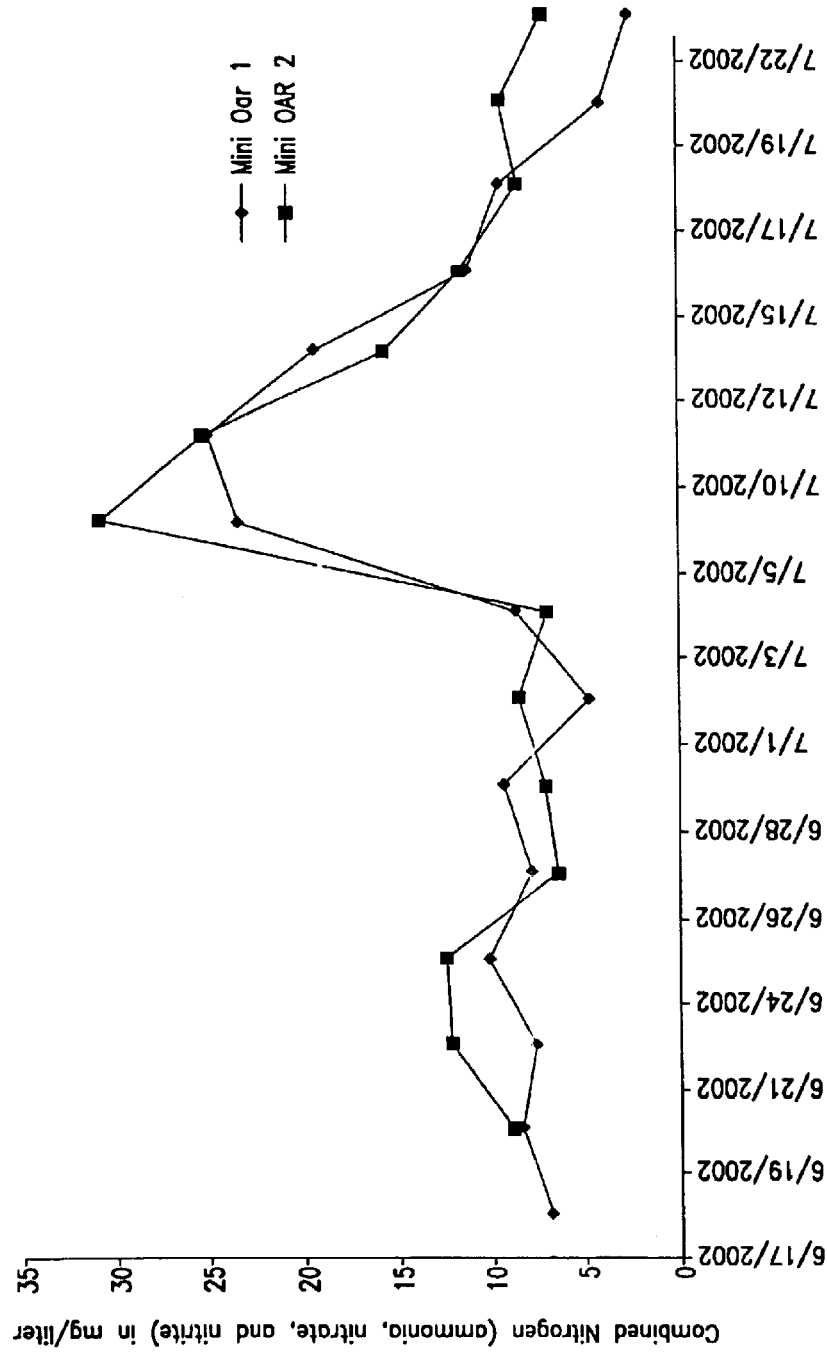
FIG. 17 is a comparison of the performance of the Mini OAR 1 (Fixed Film Media) and Mini OAR 2 for combined nitrogen, under different operating conditions.

FIG. 17. Comparison of the performance of the Mini OAR 1 (Fixed Film Media) and Mini OAR 2 for combined nitrogen, under different operating conditions.

Figure 18:
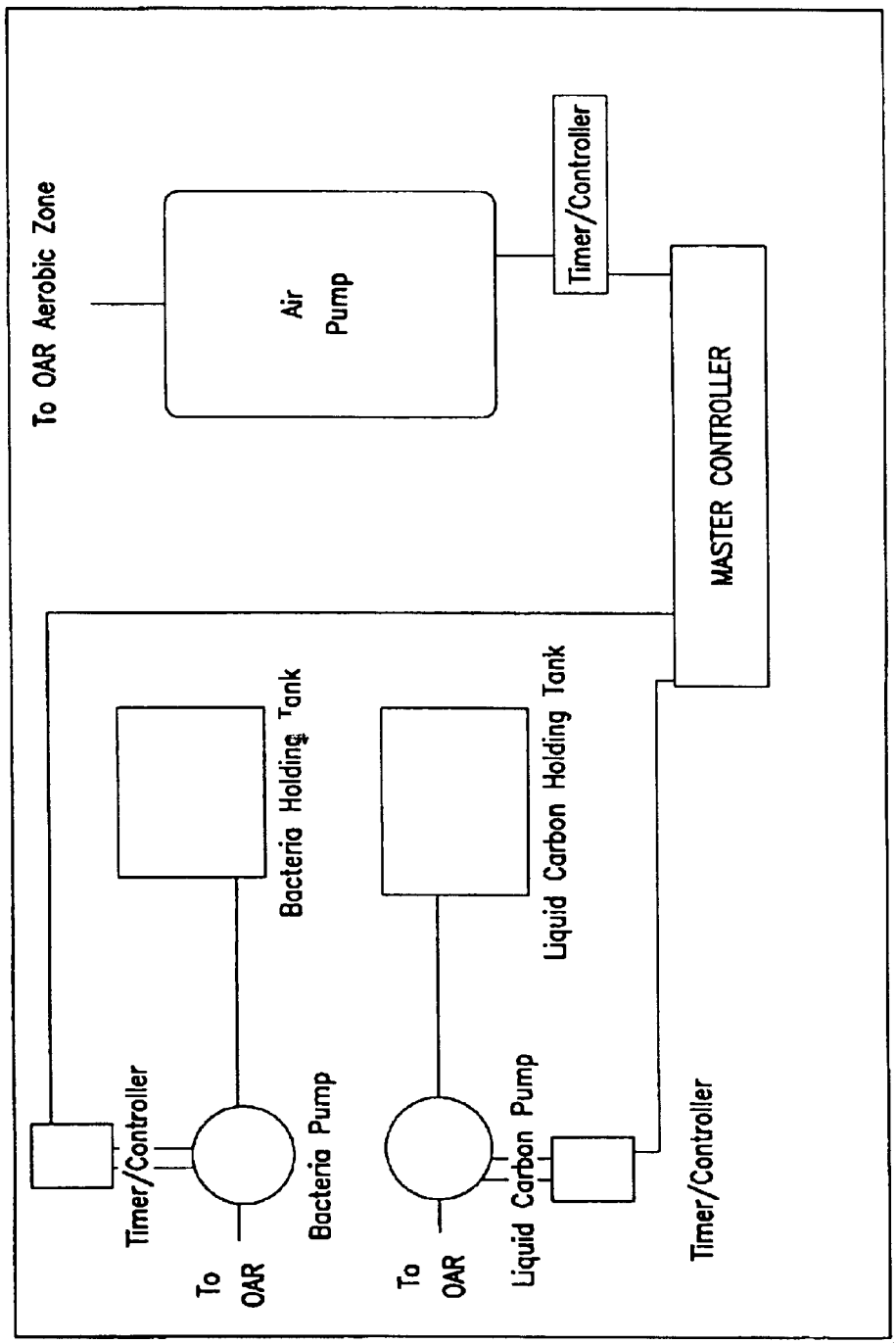
FIG. 18 is a schematic illustration of an alternative embodiment of the controller, where the layout of the different components are shown.

FIG. 18. Another embodiment of the controller, where the layout of the different components are shown. The bacteria pump, the carbon pump and the air pump are controlled by a timer/controller. The controllers may be optionally connected to a master controller for external remote control by a computer. The master controller can also receive inputs from sensors in the OAR system to monitor temperature, flow rates, ammonia, oxygen, nitrate and bacteria. These inputs may be programmed using a controller to reset the pumping rates for bacteria, carbon and air.

EXAMPLE 1

Preparation of Nitrification and Denitrification Bacteria Mixture:

Bacteria mixtures useful in nitrification and denitrification were prepared by mixing bacterial mixtures containing various bacterial strains known to nitrify and denitrify.

For nitrification, a mixture of Enterobacter Sakazaki (ATCC 29544), *Bacillus coagulans*(ATCC7050), *Bacillus subtillis*(ATCC 6051), *Bacillus subtillis*(ATCC 6051), *Bacillus megatarium*(ATCC7052), *Bacillus licheniformis* (ATCC14580), *Bacillus cerus*(ATCC4513) and *Bacillus pasytereurii*(ATCC 11859) was used. For nitrification, the bacteria were not easy to identify, and include Nitrobacter and Nitrococcus spp obtained from Cape Cod Biochemicals, 21 Commerce Road, Bourne, Mass.

Bacterial growth media was prepared in 1 liter batches by dissolving 20 g Bacto Tryptose, 2 g Bacto Dextrose, (Difco Laboratories, Detroit, Mich.), 5 g sodium chloride, and 2.5 g disodium phosphate (Sigma-Aldrich Corp., St. Louis, Mo., USA) in 1 liter of deionized water, and sterilizing at 250° F. for 15 minutes in an autocloave. The bacteria, 0.1 ml, if in liquid form, and 0.5 g, if in dry form, was added to 100 ml of media prepared above, and grown at 37° C. for 3 days. At the end of 3 days, 100 ml of the grown bacteria were added to 4 liters of growth media, and grown for 3 days before use. The bacterial mixtures were then used in field testing.

EXAMPLE 2

Preparation of Carbon Nutrient Mixtures

Carbon mixtures that are non-flammable, have low viscosity and are readily pumpable liquids, and stable to premature microbial growth were prepared by adding to 100 ml of deionized water, 50 g Maltrin M250 (Grain Processing Corporation, Muscatine, Iowa, USA), dissolving the solids, and adding 10 ml of methanol (Sigma-Aldrich). In addition to the carbon sources, other micronutrients generally used for growth of bacteria, and described in Handbook of Microbiological Media by R. N. Atlas, CRC Press, Cleveland, Ohio and Media Formulations described in the ATCC catalog ATCC 12301 Park Lane Drive, Rockville, Md., were added in the generally recommended quantities.

The carbon and nutrient mixtures were found to be stable, as measured by unwanted premature growth for over 4 weeks.

The bacterial mixtures and carbon/nutrient mixtures were tested for viability using solutions made up of ammonium chloride for ammonia conversion, and sodium nitrate for nitrate conversion. The nitrifying and denitrifying bacteria were found to be effective for conversion of ammonia and nitrate, respectively.

Ammonia was measured using a Hanna Instruments Inc, 584 Park East Drive, Woonsocket, R.I. 02895, High Range Ammonia Calorimeter, Catalog No, HI 93733, and the ammonia testing reagents kits. Nitrate was measured using a Hanna Instruments Inc., 584 Park East Drive, Woonsocket, R.I. 02895, Nitrate Calorimeter, Catalog No. HI93728, and the nitrate testing reagents kit.

The nutrient carbon mixtures were scaled up to 10 gallons, by dissolving 42 pounds of Maltin M250 in 10 gallons of deionized water using a paddle, and adding 3,785 ml of methanol (Doe and Ingals, Medford, Mass.). In addition, other micronutrients generally used for growth of bacteria described in Handbook of Microbiological Media by R. N. Atlas, CRC Press, Cleveland, Ohio and Media Formulations described in the ATCC catalog, ATCC 12301 Park Lane Drive, Rockville, Md. were added in the recommended quantities. In addition to deionized water, tap water also may be used. The carbon nutrient mixtures prepared above were used in the field testing described below.

Leaching Field Test

EXAMPLE 3

The bacterial and carbon/nutrient mixtures were then tested in a field test in a system as described in FIG. 2 and FIG. 3, in a sewage treatment testing facility. The waste water exciting the settling tank had 36 ppm nitrate, and was flowing at a rate of 78 gallons/day, and the septic/settling tank was 1500 gallons. The bacteria mixture of nitrifiers and denitrifiers was fed at a rate of 11 ml/hr for 1 hour, each 6 hours, 4 times/day. The carbon/nutrient was added at a rate of 110 ml/hr, for 1 hr every 4 hours, for a total of 660 ml/day. Samples were taken after 14 days under the leaching field at a depth of 1 ft, and 2 ft and tested for nitrate nitrogen. The results are given in Table 1.

TABLE 1

FIG. 2 Field Testing of Waste Water

|  | Nitrate | nitrogen, ppm |
| --- | --- | --- |
| Before treatment | 1 ft | 2 ft |
| under the leaching field | 29–37 ppm | 29–37 ppm |
| With treatment as in FIG. 2 | 1 ft | 2 ft |
| under the leaching field | 10 ppm | 2 ppm |

Ammonia was measured using a Hanna Instruments Inc, 584 Park East Drive, Woonsocket, R.I. 02895, High Range Ammonia Calorimeter, Catalog No, HI 93733, and the ammonia testing reagents kits. Nitrate was measured using a Hanna Instruments Inc, 584 Park East Drive, Woonsocket, R.I. 02895, Nitrate Calorimeter, Catalog No, HI93728, and the nitrate testing reagents kit.

Reactor System Test

EXAMPLE 4

The bacterial and nutrient mixtures described in examples 2 and 3 were then tested in a field test in a system as described in FIG. 5 in a sewage treatment system facility. The discharge from the treatment system reactor system had Total Nitrogen (TN) in the range 91–135 ppm, prior to the field test, and not discharging final concentrations of TKN generally required for discharge limits in waste water treatment facilities. The waste water exiting the septic/settling tank had about 91–135 ppm TN and was flowing at a rate of about 3,500 gallons/day, and the septic tank was about 5000 gallons. The reactor vessel was about 5000 gallons. The bacteria mixture, containing denitrifiers and nitrifiers capable of converting ammonia to nitrate and nitrite, and further nitrate and nitrite to nitrogen, was added continuously at the entrance to the reactor vessel at a rate of 1 liter/day for 1 week. At the end of one week, the bacterial addition was changed to 250 ml/day. Samples were taken 12 and 19 days after the initial addition of the bacteria. at the point of discharge, and tested for TN by an outside water testing laboratory. The results are given in Table 2.

TABLE 2

Reactor System (FIG. 5) Field Testing of Waste Water TN,

| Before treatment | 91–135 ppm | |
| --- | --- | --- |
| In the discharge | TN | |
| With treatment as in FIG. 5 | 12 days | 19 days |
| In the discharge | 31 ppm | 4–6 ppm |

Sludge Reduction

EXAMPLE 5

The reactor described in example 4, which was approximately 8 feet by 8 feet by 8 feet before the treatment with the bacterial mixture had sludge to a height of about 4 feet. The sludge in the reactor when measured at the end of about 90 days was approximately 1 foot.

EXAMPLE 6

Dual reactors as shown in FIG. 10 could be used for nitrification and denitrification by fermentation of waste water. Waste flow enters a 1,500 gallon settling tank that has a "T" at the effluent end that leads to a 750 gallon plastic sphere (Zabel Environmental Technology, PO Box 1520, Crestwood, Ky., 40014). House wastewater enters the settling tank in a range of 80–200 gallons per day. Settled fluid enters the primary reactor where nitrifying bacteria as described in example 3 are introduced into the system using the apparatus "Tommy Box" as shown in FIG. 10. Nutrients could be added to primary reactor to stabilize the pH and micro nutrient levels. In addition to bacteria and nutrients, optionally air may be used to aerate the system.

The aerated effluent from the primary reactor flows into the secondary reactor. The secondary 750 gallon Zabel spherical reactor receives denitrifying bacteria and carbon as described in example 3. The carbon and bacteria are added into the system on or near the bottom where little or no oxygen is available. The output of the secondary reactor flows directly into the soil absorption system.

EXAMPLE 7

The Oxic Anoxic Reactor (OAR) system as shown in FIG. 12 was installed at the Massachusetts Alternative Septic Test Center, Otis Mass. This is a variation of FIG. 9, where two apparatuses are shown. Extra pumps as needed may be installed inside the apparatus ("Tommy Box") for delivering two or more different mixtures of bacteria to specified locations in the OAR system. A larger air aerator and diffuser capable of producing oxygen concentrations in the 3 to 8 mg/liter was used. These dual tank stepwise multi tank systems are used for reducing TSS, COD, phosphate, nitrification and denitrification of the wastewater.

The OAR system is a gravity fed continuous reactor where primary effluent first enters a settling tank (Massachusetts Title V or equivalent regulations). Flow rates entering the tank ranged from 100–550 gallons per day. Over one year the influent temperature and oxygen levels ranged 2 to 28 degrees Celsius, and 0.0–0.5 mg/l respectively. The second stage flows into the first OAR tank, aerobic reactor, (T1) where temperature and oxygen are monitored by sensors. The sensor information is used to control the temperature and oxic conditions. The air is purged into T1 using a diffuser for better aeration. The need for bacteria is also monitored and added as needed. Residence time or dwell in T1 is designed to average about 1–6 or more days depending on the level of nitrification needed. Oxygen concentration and temperature are held between 3.0–8.0 mg/l and about 20–40 degrees Celsius respectively, by means of an aerator and a heating means inserted into the tank T1. The preferred temperature is 24 degrees Celsius. The heating means may be by electrical heating or solar heating with temperature controls. Growing nitrifying bacteria and denitrifying bacteria are introduced at a rate of 1 to 10 ml per 100 gallons of raw effluent flow. Bacterial concentrations ranged from 10 exponent 12 to 10 exponent 17 cells per ml. Nitrified effluent passes through T1 into an optional filter and into Tank 2 (T2). T2 contains injection ports to deliver the non-flammable carbon source of the invention, as well as nitrifying bacteria from the apparatus. While other sources of carbon may be used, it is preferable to use the non-flammable liquid carbon source of the invention as the bacteria have been specifically grown in that carbon source, and the carbon source contains the preferred nutrients for the optimum performance of the bacteria. The carbon pump is set to deliver carbon at a rate sufficient to decrease the nitrogen level desired by the local wastewater regulations. Generally for 1 mg of nitrogen, 1–4 mg of carbon would be needed for bringing the level of nitrogen to below 10 mg/l, depending on the content of carbon present in the nitrified wastewater. The wastewater flow rate and the concentration of nitrogen in the influent dictate the flow rate and volume of carbon to be delivered. The outlet of the tank T1 can have an optional filter for removing particulates and any large media particles or suspended media introduced. T1 can also contain fixed film media if desired. The oxygen level in T2 rapidly approached near undetectable values from top to bottom of the tank for anoxic conditions. Residence time is designed to average 1–4 days, preferably 2 to 3 days. Denitrifying bacteria that had been previously added in T1 where they begin their initial growth under aerobic conditions can migrate to T2 and continue the denitrification under anoxic conditions. Optionally, denitrifying bacteria can be added to T2 as needed for denitrification. The OAR system allows the separation of various microbiological functions to enable complete system control and testing capabilities. Optionally, a filter is placed at the end of the tank T2 for particulate removal as well as for holding any suspended media introduced to the system for bacteria growing on surfaces. Fixed film media may also be introduced into T2 as desired. Optionally, a membrane filter, such as a hollow fiber or flat sheet membrane may be used to filter the effluent, by applying a vacuum to the lumen side, leaving the bacteria in the tank T2. The effluent finally travels to a distribution box where it is distributed to a soil absorption system such as a leaching field. The effluent may also be directed to a sand filter or modified sand filter for additional removal of suspended solids, bacteria, and in addition can be treated using ultraviolet light, ozone or chlorine to provide tertiary treated water or recycled water, and further treated by reverse osmosis as needed. The tanks T1 and T2 are placed in the ground such that T1 is at a lower level compared to the settling tank outflow, and T2 is at a lower level relative to T1 so that there is gravity flow. This avoids the need for pumping of wastewater required in many commercial systems and is energetically favourable.

The OAR system was started on day 1 receiving 150 gal/day with influent from a trench that was fed from a septic tank. Influent levels were for Ammonia of about 35 mg/l, Nitrate close to 0 mg/l, Oxygen close to 0 mg/l, Total Suspended Solids (TSS) in the range 150–230 mg/l, Chemical and Biological Oxygen Demand (CBOD), in the range 235–339 mg/ml. On day 17, the OAR effluent exciting from T2 had TSS<30 mg/l, CBOD<20 mg/l, Total Nitrogen (Ammonia plus Nitrate) was generally below 10 mg/l. Sample measurements for each data point were taken 3 times a week.

For the oxic and anoxic reactors, additional mixing means such as stirrers and mixes can be added to improve the performance of the system, and keep especially suspended fixed film media in suspension. In addition, if activated sludge is used, the controlled addition of bacteria can improve the performance of the activated sludge system over and above its normal performance.

EXAMPLE 8

FIG. 13 shows the use of the invention to improve the performance of U.S. Pat. No. 5,588,777 incorporated herein by reference. The apparatus (not shown) introduces nitrifying bacteria after the septic tank, so that the bacteria are dispersed in the sand filter. Optionally denitrifying bacteria may also be introduced and additional aeration provided. Instead of the liquid soap, the non-flammable carbon source can be used. Denitrifiers may also be added in the anoxic bottom zone of the filter.

EXAMPLE 9

FIG. 14A shows the use of the invention to improve the performance of U.S. Pat. No. 4,465,594 incorporated by reference. The apparatus (not shown) introduces nitrifying bacteria after the septic tank to the holding tank (10), so that the bacteria are dispersed in the (aerobic) nitrification filter (12). An optional mixing tank may be provided between the nitrification filter and the holding tank for receiving the nitrifying bacteria. This holding tank is optionally heated to between 10 and 35 degrees Celsius for improved nitrification. The heated nitrified effluent is collected in the chamber 18. Denitrifying bacteria is introduced to chamber (18) along with non-explosive carbon described in this invention. The chamber can optionally have mixing means for better dispersion of denitrifying bacteria and carbon. The bacteria and carbon flows to the anoxic detention tanks where denitrification takes place.

EXAMPLE 10

FIG. 14B is another embodiment of the invention where the apparatus is used to introduce nitrifying bacteria into a pump chamber before the nitrification filter. Optionally, the pump chamber may also be aerated for efficient nitrification in addition to that provided by the air vent. Furthermore, the pump chamber may be heated to maintain a temperature of between 10 and 35 degrees Celsius for efficient nitrification. The apparatus is used to introduce denitrifying bacteria and a carbon source into the mixing chamber. The use of the denitrifying bacteria grown with the non-flammable carbon source is preferred.

EXAMPLE 11

The effluent from the septic tanks (the primary treatment) were tested using a scaled down version of the Oxic Anoxic Reactor (OAR) scaled down to 1 liter, with and without a fixed film media. The effluent from the sepic tank is the same effluent used in example 7, and had combined nitrogen in the 35 mg/l range. The fixed film media used was a fibrous filter used for air filtration produced by Flanders Precision Aire, St. Petersburg, Fla. FIGS. 15 and 16 show different layout for the apparatus to be used with the OAR system. Air was introduced to the aerobic reactors in FIGS. 15 (Mini OAR 1) and 16 (Mini OAR 2). The flow rate of the effluent entering the aerobic tank was between 100–300 ml/day. Growing nitrifying bacteria was added to the aerobic reactor at the rate of 1 ml/day, once a day because of the small volume. The liquid carbon was added at the rate of 0.1 ml/day, once a day. The temperature of this system was kept at room temperature of between 16 to 20 degrees Celsius.

FIG. 17 gives the combined nitrogen data under various conditions. From Jun. 17, 2002 to Jul. 3, 2002 growing bacteria and liquid carbon were added as described above. The combined nitrogen stayed below 12 mg/l during this period. On Jul. 3, 2002, the addition of growing bacteria and liquid carbon was stopped, and resulted in an increase of the combined nitrogen to between 20 and 30 mg/l. On Jul. 10, 2002, the addition of bacteria and carbon was resumed. Within one week, the combined nitrogen in both OAR systems was below 10 mg/l and trending towards the values before the disruption in the addition of bacteria and carbon. Use of a suspended film media is expected to produce a similar result.

EXAMPLE 12

Power Failure Stress Test

Power shut off stress test of the 220 gallon per day OAR (Oxic Anoxic Reactors) as shown in FIG. 12 was carried out as follows. The OAR installed at the Massachusetts Alternative Septic Test Center, Otis Mass. Nitrification and denitrification of the waste water was monitored to determine the effects of 4 days of complete power shut down. During 4 days from May 24 to May 28, 2002 all electrical power was shut off on the OAR System. Effluent continued to be sent into the system. Throughout the 4-day period air, carbon, heat and bacteria were not functional. Total Nitrogen (Ammonia and Nitrate) during the shut off the system was still below 20 mg/liter. Three days after restoring power the Total Nitrogen began to drop back to below 10 mg/liter in 7 days.

EXAMPLE 13

Stability of non-flammable liquid carbon to microbial stability was tested. Non-flammable liquid carbon was made by dissolving 1000 ml of deionized water 500 g of Maltrin M250 and micronutrients described in example 2 without methanol. The liquid carbon solution was divided into 5 aliquots of 100 ml each by transferring into 100 ml sterile glass bottles baked at 250 degrees Celsius. One bottle was kept as a control. To the second bottle 5 ml methanol was added to bring the methanol concentration to 5%. To the third 5 ml of formalin (10% formaldehyde solution) was added to bring the formalin concentration to 5% of the added formalin. To the fourth 2 ml of Iodopropynyl Bulycarbamate (Germal) was added to bring the Iodopropynyl Bulycarbamate concentration to 2%. To the fourth bottle 10 ml sodium hypochlorite solution (Americas Choice Bleach Compass Foods, Modale N.J. USA) was added to bring the added bleach concentration to 10%. To the fifth bottle 3 ml 1M sodium hydroxide was added to bring the pH of the solution to 12.6. Each bottle was then spiked with 0.1 ml of bacteria cultures grown for 4 days on Difco TPD Media. The samples were stored at 18 to 20 degrees Celsius for one week and observed daily.

The control liquid carbon carbohydrate solution with no additive was cloudy with stringy mass and pale yellow color. The methanol, formalin and Germal were all clear with pale yellow color, the bleach was clear with no color, and the bottle with sodium hydroxide was clear with dark yellow color. The control showed rapid growth in less than 2 days, whereas none of the others showed any growth.

In addition to the use of nitrifying and denitrifying bacteria, a wide variety bacteria and bacterial mixtures can be used to modify or remove a many pollutants, contaminants from many sources. Several of the bacteria mixtures are available commercially, such as from Bio-Systems Corporation, 1238 Inman Parkway, Beloit, Wis. 53511, and incorporated by reference. The bacteria may treat municipal, industrial, commercial, and residential waste. Some of these users are for degradation of complex chemicals such as phenols, benzene compounds, surfactants, alcohols, aliphatic compounds, aromatic compounds, and other ionic waste such as chlorates, perchlorates, cyanides, nitrites, nitrates or any other pollutant that can be reacted and removed by bacteria. Other users for contaminant and pollutant control and removal are in chemical waste, grease removal, grease control, chlorinated organics, dairy waste, refinery waste, hydrocarbon soil remediation, marine pollutant control, hydrocarbon oil sump treatment, municipal activated sludge, fish farming, pulp and paper bioaugmentation, municipal lagoons, manure waste, portable toilet treatments, drain and grease traps, odor control, and septic tank treatments. Additional potential uses are in aquaculture, aquariums, food waste and grease traps, pond reclamation and farm waste remediation.

The invention is equally applicable to any wastewater system that suffers from frequent failure, and that has separate oxic, aerobic, anoxic and anaerobic regions. This invention can be used with recirculating sand filters, trickling filters, and any aerobic and anaerobic treatment systems. The applicability of this invention is not restricted to nitrification and denitrification, and equally applicable to other pollutants which can be microbiologically treated.

What is claimed is:

1. Apparatus for the treatment of contaminants in water, comprising:
    a source of growing nitrifying bacteria effective for treating said contaminants under aerobic conditions, and a source of growing denitrifying bacteria effective for denitrification under anaerobic conditions; and
    a controller for introducing said growing bacteria to said contaminants in a predetermined amount over a predetermined period of time.

2. The apparatus of claim 1, wherein said controller further introduces nutrients to said contaminants in water.

3. The apparatus of claim 2, wherein said nutrients comprise a carbon source or a mixture of a carbon source and micronutrients.

4. The apparatus of claim 3, wherein said carbon source is liquid and non-flammable.

5. The apparatus of claim 3, wherein said carbon source comprises at least one carbohydrate.

6. The apparatus of claim 1, further comprising a nitrification vessel.

7. The apparatus of claim 6, wherein said denitrifying bacteria are introduced upstream of said nitrification vessel.

8. The apparatus of claim 6, wherein said nitrification vessel is heated to a temperature of from about 10 to about 40° C.

9. The apparatus of claim 1, wherein said growing bacteria are in the log growth stage.

10. A process for purifying contaminated water, comprising:
   providing growing nitrifying bacteria effective for treating contaminants in said contaminated water under aerobic conditions;
   providing growing denitrifying bacteria effective for nitrification under anaerobic conditions; and
   introducing into said contaminated water said growing bacteria in a predetermined amount over a predetermined time period effective, for purifying said contaminated water.

11. The process of claim 10, further comprising providing said growing bacteria with a carbon source.

12. The process of claim 11, wherein said carbon source includes a bacteriostat.

13. The process of claim 11, further comprising creating said growing denitrifying bacteria by feeding bacteria with said carbon source.

14. In a waste water treatment system including a settling tank, apparatus for introducing growing bacteria into said system, comprising:
   a source of growing nitrifying bacteria effective for treating said contaminants under aerobic conditions;
   a source of growing denitrifying bacteria effective for denitrification under anaerobic conditions; and
   a controller for introducing said growing bacteria to said contaminants downstream of said settling tank in a predetermined amount over a predetermined period of time.

15. The waste water treatment system of claim 14, wherein said settling tank is a septic tank.

16. In the waste water treatment system of claim 14, said controller further introducing a carbon source to said contaminants in water.

17. Apparatus for introducing bacteria and bacteria nutrients to a waste water treatment system, comprising:
   a first bacteria holding tank for storing nitrifying bacteria under aerobic conditions;
   a second bacteria holding tank for storing denitrifying bacteria under anaerobic conditions;
   a bacteria pump in fluid communication with said first bacteria holding tank for pumping said nitrifying bacteria to said system;
   a bacteria pump in fluid communication with said second bacteria holding tank for pumping said denitrifying bacteria to said system;
   a nutrient holding tank for storing nutrients for said bacteria;
   a nutrient pump in fluid communication with said nutrient holding tank for pumping said nutrients to said system; and
   a controller for controlling the timing of said pumping of said bacteria and of said nutrients.

18. The apparatus of claim 17, further comprising means for introducing oxygen into said system.

* * * * *